United States Patent
Tsai et al.

(10) Patent No.: US 11,240,809 B2
(45) Date of Patent: Feb. 1, 2022

(54) METHOD AND APPARATUS OF BEAM DETERMINATION IN A WIRELESS COMMUNICATION SYSTEM

(71) Applicant: ASUSTek Computer Inc., Taipei (TW)

(72) Inventors: Hsin-Hsi Tsai, Taipei (TW); Yu-Hsuan Guo, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/131,598

(22) Filed: Sep. 14, 2018

(65) Prior Publication Data

US 2019/0090227 A1    Mar. 21, 2019

Related U.S. Application Data

(60) Provisional application No. 62/560,949, filed on Sep. 20, 2017.

(51) Int. Cl.
*H04W 72/04* (2009.01)
*H04W 56/00* (2009.01)
(Continued)

(52) U.S. Cl.
CPC ........ *H04W 72/046* (2013.01); *H04B 7/0626* (2013.01); *H04L 5/0098* (2013.01); *H04W 56/0015* (2013.01); *H04W 72/0426* (2013.01)

(58) Field of Classification Search
CPC ..... H04W 72/04; H04W 88/08; H04W 76/00; H04W 72/046; H04W 72/0426; H04W 56/0015; H04B 7/0626; H04L 5/0098
See application file for complete search history.

(56) References Cited

U.S. PATENT DOCUMENTS 9,730,097 B2    8/2017  Yu et al.
9,900,891 B1 *  2/2018  Islam .............. H04W 72/042
(Continued)

FOREIGN PATENT DOCUMENTS

EP    3200498    2/2017
EP    3200498    8/2017
(Continued)

OTHER PUBLICATIONS

European Search Report from corresponding EP Application No. 18194536.1, dated Jan. 31, 2019.
(Continued)

*Primary Examiner* — Hassan A Phillips
*Assistant Examiner* — Prenell P Jones
(74) *Attorney, Agent, or Firm* — Skaar Ulbrich Macari, P.A.

(57) ABSTRACT

A method and apparatus are disclosed from the perspective of a UE (User Equipment). In one embodiment, the method includes the UE receiving an SCell activation/deactivation MAC (Medium Access Control) control element to activate the SCell. The method further includes the UE activates the SCell based on the SCell activation/deactivation MAC control element. The method also includes the UE receiving a beam indication by a MAC control element via the PCell, wherein the beam indication includes a cell index and the beam indication is used to derive at least one beam to be used in the SCell. In addition, the method includes the UE using the at least one beam for a DL (Downlink) transmission or an UL (Uplink) transmission in the SCell.

16 Claims, 20 Drawing Sheets

(51) Int. Cl.
*H04B 7/06* (2006.01)
*H04L 5/00* (2006.01)

(56) References Cited

U.S. PATENT DOCUMENTS

| | | | | |
|---|---|---|---|---|
| 2011/0261747 | A1* | 10/2011 | Wang | H04B 7/155 |
| | | | | 370/315 |
| 2013/0156010 | A1 | 6/2013 | Dinan | |
| 2017/0142751 | A1* | 5/2017 | Liu | H04L 5/1415 |
| 2017/0170942 | A1 | 6/2017 | Qiu et al. | |
| 2017/0195998 | A1* | 7/2017 | Zhang | H04B 7/086 |
| 2018/0234931 | A1* | 8/2018 | Ly | H04L 5/005 |
| 2018/0324853 | A1* | 11/2018 | Jeon | H04W 74/006 |
| 2018/0359790 | A1* | 12/2018 | Ingale | H04W 28/16 |
| 2019/0037498 | A1* | 1/2019 | Tseng | H04W 52/0219 |
| 2019/0081688 | A1* | 3/2019 | Deenoo | H04L 5/0069 |
| 2019/0150161 | A1* | 5/2019 | Cheng | H04W 72/085 |
| | | | | 370/330 |
| 2019/0215119 | A1* | 7/2019 | Kim | H04L 1/0027 |
| 2019/0253128 | A1* | 8/2019 | Moon | H04B 7/0695 |
| 2019/0319686 | A1* | 10/2019 | Chen, IV | H04W 72/046 |
| 2020/0022040 | A1* | 1/2020 | Chen | H04W 56/001 |
| 2020/0028545 | A1* | 1/2020 | Koskela | H04W 76/19 |
| 2020/0196161 | A1* | 6/2020 | Ahn | H04W 80/08 |
| 2020/0374960 | A1* | 11/2020 | Deenoo | H04W 72/14 |

FOREIGN PATENT DOCUMENTS

| | | |
|---|---|---|
| KR | 20170106313 | 9/2017 |
| WO | 2014112783 | 7/2014 |
| WO | 2015170917 | 11/2015 |
| WO | 2017030478 | 2/2017 |
| WO | 2017084607 | 5/2017 |
| WO | 2017151185 | 9/2017 |
| WO | 2019096162 | 5/2019 |

OTHER PUBLICATIONS

ASUSTEK: "Discussion on UL Beam Managment", 3GPP Draft, R1-1716550, Discussion on UL Beam Management Clean, 3rd Generation Partnership Project (3GPP), Mobile Competence Centre; 650, Route Des Lucioles; F-06921 Sophia-Antipolis Cedex; France, vol. Ran WG1, No. Nagoya, Japan; Sep. 18-21, 2017, Sep. 17, 2017, XP051340003.
Ericsson: "Analysis of beam indication signalling option", 3GPP Draft; R1-1716367 Analysis of Beam Inedication Signalling Options, 3rd Generation Partnership Project (3GPP), MObile Competence Centre; 650, Route Des Lucioles; F-06921 Sophia-Antipolis Cedex; vol. RAN WG1, No. Nagoya, Japan; Sep. 18-21, 2017, Sep. 12, 2017, XP051329956.
Communication pursuant to Article 94(3) EPC from corresponding EP Application No. 18194536.1, dated Jul. 15, 2019.
3GPP TSG RAN WG1 Meeting NR#3 R1-1716550, "Discussion on UL Beam Management", Nagoya, Japan, Sep. 18-21, 2017.
Office Action from Taiwan Intellectual Property Office in corresponding TIPO Application No. 107132545, dated Sep. 5, 2019.
Office Action from Korean Intellectual Property Office in corresponding KR Application No. 10-2018-0110249, dated Apr. 3, 2020.
Office Action from Intellectual Property India in corresponding IN Application No. 201814034636, dated May 27, 2020.

* cited by examiner

| Channel or signal | OFDM symbol number $l$ | Subcarrier number $k$ |
|---|---|---|
| PSS | 0 | 80, 81, ..., 206 |
| SSS | 2 | 80, 81, ..., 206 |
| PBCH | 1, 3 | 0, 1, ..., 287 |
| DM-RS for PBCH | 1, 3 | $0+v, 4+v, 8+v, ..., 280+v, 284+v$ |

FIG. 5 (PRIOR ART)

METHOD AND APPARATUS OF BEAM DETERMINATION IN A WIRELESS COMMUNICATION SYSTEM

CROSS-REFERENCE TO RELATED APPLICATIONS

The present Application claims the benefit of U.S. Provisional Patent Application Ser. No. 62/560,949 filed on Sep. 20, 2017, the entire disclosure of which is incorporated herein in its entirety by reference.

FIELD

This disclosure generally relates to wireless communication networks, and more particularly, to a method and apparatus for beam determination in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes the UE receiving an SCell activation/deactivation MAC (Medium Access Control) control element to activate the SCell. The method further includes the UE activates the SCell based on the SCell activation/deactivation MAC control element. The method also includes the UE receiving a beam indication by a MAC control element via the PCell, wherein the beam indication includes a cell index and the beam indication is used to derive at least one beam to be used in the SCell. In addition, the method includes the UE using the at least one beam for a DL (Downlink) transmission or an UL (Uplink) transmission in the SCell.

BRIEF DESCRIPTION OF THE DRAWINGS

FIG. 5 is a reproduction of Table 7.4.3.1-1 of 3GPP TS 38.211 V1.0.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: R2-162366, "Beam Forming Impacts", Nokia and Alcatel-Lucent; R2-163716, "Discussion on terminology of beamforming based high frequency NR", Samsung; R2-162709, "Beam support in NR", Intel; R2-162762, "Active Mode Mobility in NR: SINR drops in higher frequencies", Ericsson; 3GPP RAN2 #94 meeting minute; TS 36.321 V14.0.0, "Evolved Universal Terrestrial Radio Access (E-UTRA); Medium Access Control (MAC) protocol specification"; TS 36.331 V14.1.0, "Evolved Universal Terrestrial Radio Access (E-UTRA); Radio Resource Control (RRC); Protocol specification"; TS 36.300 V14.1.0, "Evolved Universal Terrestrial Radio Access (E-UTRA) and Evolved Universal Terrestrial Radio Access Network (E-UTRAN); Overall description; Stage 2"; TR 38.802 V14.1.0, "Study on New Radio Access Technology Physical Layer Aspects"; TS 38.214 V1.0.0, "NR; Physical layer procedures for data (Release 15)"; TS 38.211 V1.0.0, "NR; Physical channels and modulation (Release 15)"; Final Report of 3GPP TSG RAN WG1 #88bis v1.0.0 (Spokane, USA, 3-7 Apr. 2017); Final Report of 3GPP TSG RAN WG1 #89 v1.0.0 (Hangzhou, China, 15-19 May 2017); and Final Chairman's Note of 3GPP TSG RAN WG1 Meeting #90 (Prague, Czech Republic, 21-25 Aug. 2017). The standards and documents listed above are hereby expressly incorporated by reference in their entirety.

Figure 1:
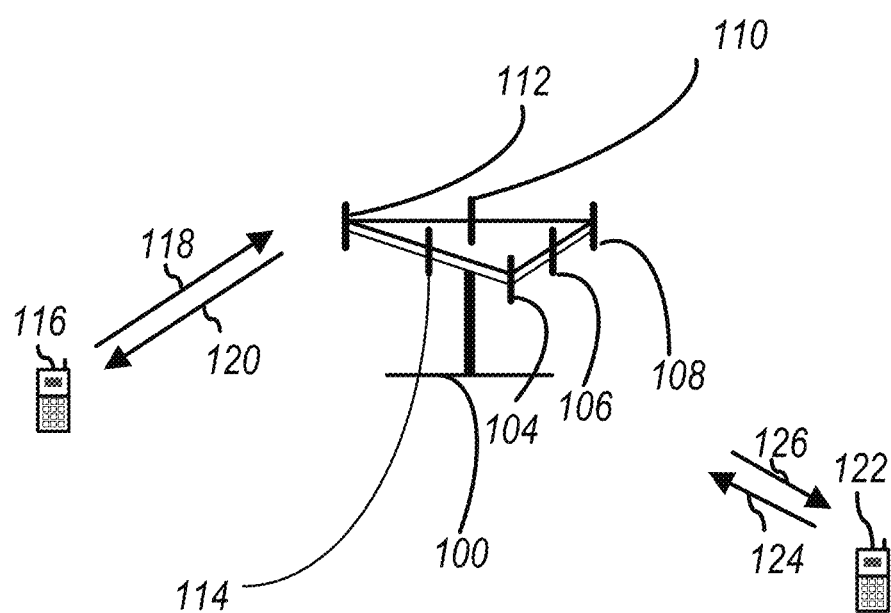
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
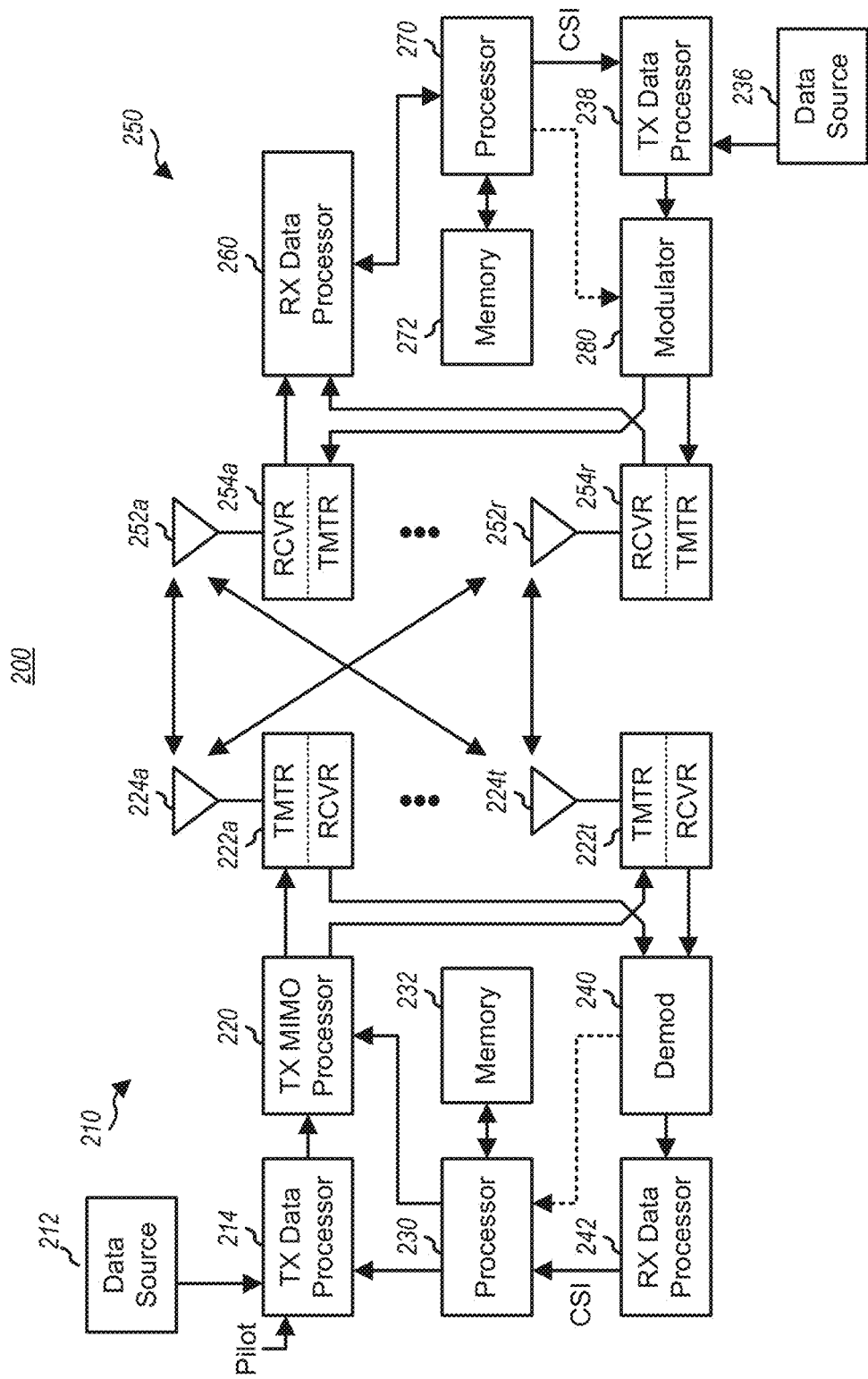
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
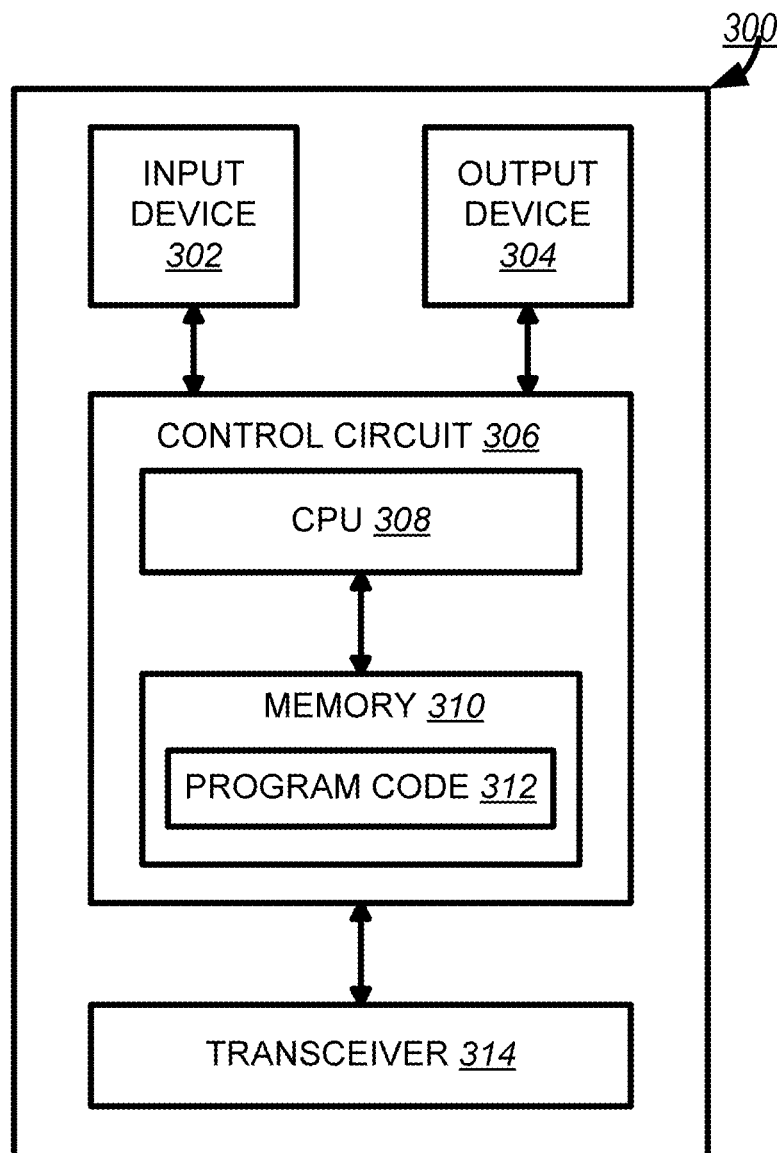
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
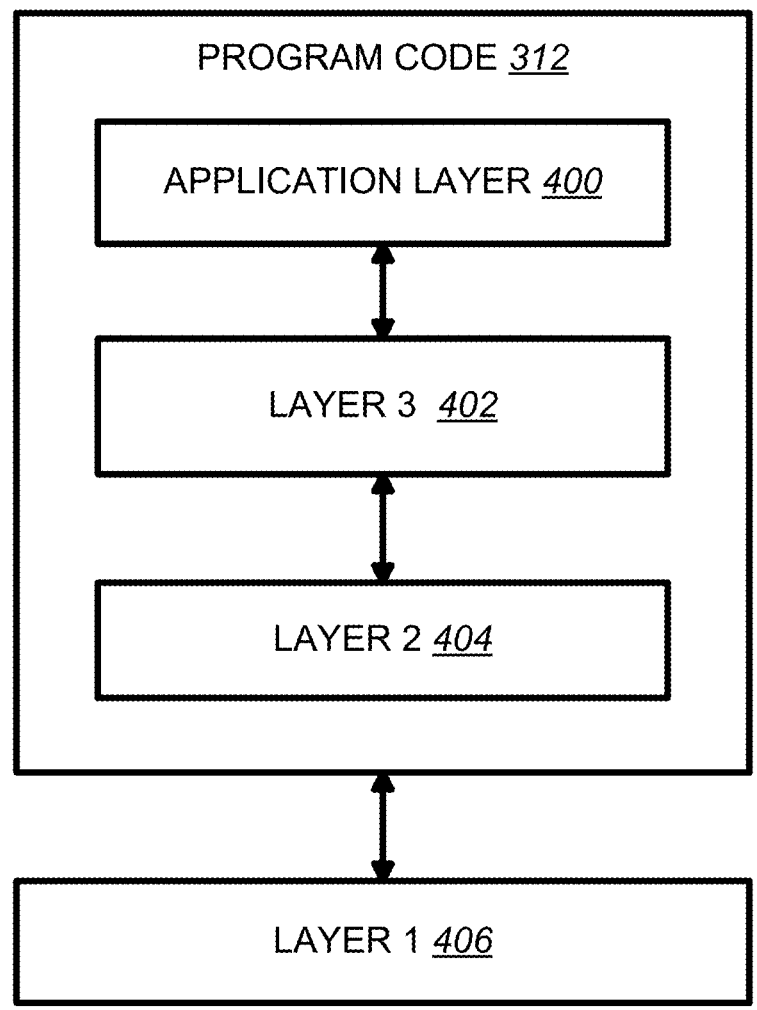
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e. 5G) access technology have been launched since March 2015. In general, the next generation access technology aims to support the following three families of usage scenarios for satisfying both the urgent market needs and the more long-term requirements set forth by the ITU-R IMT-2020:

eMBB (enhanced Mobile Broadband)

mMTC (massive Machine Type Communications)

URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Based on 3GPP R2-162366, in lower frequency bands (e.g., current LTE bands<6 GHz) the required cell coverage may be provided by forming a wide sector beam for transmitting downlink common channels. However, utilizing wide sector beam on higher frequencies (>>6 GHz) the cell coverage is reduced with same antenna gain. Thus, in order to provide required cell coverage on higher frequency bands, higher antenna gain is needed to compensate the increased path loss. To increase the antenna gain over a wide sector beam, larger antenna arrays (number of antenna elements ranging from tens to hundreds) are used to form high gain beams.

As a consequence the high gain beams being narrow compared to a wide sector beam, multiple beams for transmitting downlink common channels are needed to cover the required cell area. The number of concurrent high gain beams that access point is able to form may be limited by the cost and complexity of the utilized transceiver architecture. In practice, in higher frequencies, the number of concurrent high gain beams is much less than the total number of beams required to cover the cell area. In other words, the access point is able to cover only part of the cell area by using a subset of beams at any given time.

Based on 3GPP R2-163716, beamforming is a signal processing technique used in antenna arrays for directional signal transmission/reception. With beamforming, a beam can be formed by combining elements in a phased array of antennas in such a way that signals at particular angles experience constructive interference while others experience destructive interference. Different beams can be utilized simultaneously using multiple arrays of antennas.

Beamforming can be generally categorized into three types of implementation: digital beamforming, hybrid beamforming, and analog beamforming. For digital beamforming, the beam is generated on the digital domain, i.e. the weighting of each antenna element can be controlled by baseband (e.g. connected to a TXRU (Transceiver Units)). Therefore it is very easy to tune the beam direction of each subband differently across the system bandwidth. Also, to change beam direction from time to time does not require any switching time between OFDM (Orthogonal Frequency Division Multiplexing) symbols. All beams whose directions cover the whole coverage can be generated simultaneously. However, this structure requires (almost) one-to-one mapping between TXRU (transceiver/RF chain) and antenna element and is quite complicated as the number of antenna element increases and system bandwidth increases (also heat problem exists).

For Analog beamforming, the beam is generated on the analog domain, i.e. the weighting of each antenna element can be controlled by an amplitude/phase shifter in the RF (Radio Frequency) circuit. Since the weighing is purely controlled by the circuit, the same beam direction would apply on the whole system bandwidth. Also, if beam direction is to be changed, switching time is required. The number of beams generated simultaneous by an analog beamforming depends on the number of TXRU. Note that for a given size of array, the increase of TXRU may decrease the antenna element of each beam, such that wider beam would be generated. In short, analog beamforming could avoid the complexity and heat problem of digital beamforming, while is more restricted in operation. Hybrid beamforming can be considered as a compromise between analog and digital beamforming, where the beam can come from both analog and digital domain.

Based on 3GPP R2-162709, an eNB may have multiple TRPs (either centralized or distributed). Each TRP (Transmission/Reception Point) can form multiple beams. The number of beams and the number of simultaneous beams in the time/frequency domain depend on the number of antenna array elements and the RF (Radio Frequency) at the TRP.

Potential mobility type for NR can be listed as follows:

Intra-TRP mobility

Inter-TRP mobility

Inter-NR eNB mobility

Based on 3GPP R2-162762, reliability of a system purely relying on beamforming and operating in higher frequencies might be challenging, since the coverage might be more sensitive to both time and space variations. As a consequence of that the SINR (Signal to Interference Plus Noise Ratio) of that narrow link can drop much quicker than in the case of LTE.

Using antenna arrays at access nodes with the number of elements in the hundreds, fairly regular grid-of-beams coverage patterns with tens or hundreds of candidate beams per node may be created. The coverage area of an individual beam from such array may be small, down to the order of some tens of meters in width. As a consequence, channel quality degradation outside the current serving beam area is quicker than in the case of wide area coverage, as provided by LTE.

As discussed in 3GPP RAN 2 #94 meeting minute, 1 NR eNB (e.g. called gNB) corresponds to 1 or many TRPs. Two levels of network controlled mobility:
RRC driven at "cell" level.
Zero/Minimum RRC involvement (e.g. at MAC/PHY).

3GPP TR 38.802 provides an introduction corresponding to beamforming as follows:
6.1.6 Multi-Antenna Scheme
6.1.6.1 Beam Management
In NR, beam management is defined as follows:
Beam management: a set of L1/L2 procedures to acquire and maintain a set of TRP(s) and/or UE beams that can be used for DL and UL transmission/reception, which include at least following aspects:
Beam determination: for TRP(s) or UE to select of its own Tx/Rx beam(s).
Beam measurement: for TRP(s) or UE to measure characteristics of received beamformed signals
Beam reporting: for UE to report information of beamformed signal(s) based on beam measurement
Beam sweeping: operation of covering a spatial area, with beams transmitted and/or received during a time interval in a predetermined way.
Also, the followings are defined as Tx/Rx beam correspondence at TRP and UE:
Tx/Rx beam correspondence at TRP holds if at least one of the following is satisfied:
TRP is able to determine a TRP Rx beam for the uplink reception based on UE's downlink measurement on TRP's one or more Tx beams.
TRP is able to determine a TRP Tx beam for the downlink transmission based on TRP's uplink measurement on TRP's one or more Rx beams
Tx/Rx beam correspondence at UE holds if at least one of the following is satisfied:
UE is able to determine a UE Tx beam for the uplink transmission based on UE's downlink measurement on UE's one or more Rx beams.
UE is able to determine a UE Rx beam for the downlink reception based on TRP's indication based on uplink measurement on UE's one or more Tx beams.
Capability indication of UE beam correspondence related information to TRP is supported.
Note that definition/terminology of Tx/Rx beam correspondence is for convenience of discussion. The detailed performance conditions are up to RAN4.

The following DL L1/L2 beam management procedures are supported within one or multiple TRPs:
P-1: is used to enable UE measurement on different TRP Tx beams to support selection of TRP Tx beams/UE Rx beam(s)
For beamforming at TRP, it typically includes a intra/inter-TRP Tx beam sweep from a set of different beams. For beamforming at UE, it typically includes a UE Rx beam sweep from a set of different beams.
P-2: is used to enable UE measurement on different TRP Tx beams to possibly change inter/intra-TRP Tx beam(s)
From a possibly smaller set of beams for beam refinement than in P-1. Note that P-2 can be a special case of P-1.
P-3: is used to enable UE measurement on the same TRP Tx beam to change UE Rx beam in the case UE uses beamforming At least network triggered aperiodic beam reporting is supported under P-1, P-2, and P-3 related operations.

UE measurement based on RS for beam management (at least CSI-RS) is composed of K (=total number of configured beams) beams, and UE reports measurement results of N selected Tx beams, where N is not necessarily fixed number. Note that the procedure based on RS for mobility purpose is not precluded. Reporting information at least include measurement quantities for N beam (s) and information indicating N DL Tx beam(s), if N<K. Specifically, when a UE is configured with $K'>1$ non-zero power (NZP) CSI-RS resources, a UE can report N' CRIB (CSI-RS Resource Indicator).

A UE can be configured with the following high layer parameters for beam management:
$N≥1$ reporting settings, $M≥1$ resource settings
The links between reporting settings and resource settings are configured in the agreed CSI measurement setting
CSI-RS based P-1 & P-2 are supported with resource and reporting settings
P-3 can be supported with or without reporting setting
A reporting setting at least including
Information indicating selected beam(s)
L1 measurement reporting
Time-domain behavior: e.g. aperiodic, periodic, semi-persistent
Frequency-granularity if multiple frequency granularities are supported
A resource setting at least including
Time-domain behavior: e.g. aperiodic, periodic, semi-persistent
RS type: NZP CSI-RS at least
At least one CSI-RS resource set, with each CSI-RS resource set having $K≥1$ CSI-RS resources
Some parameters of K CSI-RS resources can be the same, e.g. port number, time-domain behavior, density and periodicity if any
At least one of these two alternatives of beam reporting is supported.
Alt 1:
UE reports information about TRP Tx Beam(s) that can be received using selected UE Rx beam set(s) where a Rx beam set refers to a set of UE Rx beams that are used for receiving a DL signal. Note that it is UE implementation issues on how to construct the Rx beam set. One example is that each of Rx beam in a UE Rx beam set corresponds to a selected Rx beam in each panel. For UEs with more than one UE Rx beam sets, the UE can report TRP Tx Beam(s) and an identifier of the associated UE Rx beam set per reported TX beam(s).
NOTE: Different TRP Tx beams reported for the same Rx beam set can be received simultaneously at the UE.
NOTE: Different TRP TX beams reported for different UE Rx beam set may not be possible to be received simultaneously at the UE
Alt 2:
UE reports information about TRP Tx Beam(s) per UE antenna group basis where UE antenna group refers to receive UE antenna panel or subarray. For UEs with more than one UE antenna group, the UE can report TRP Tx Beam(s) and an identifier of the associated UE antenna group per reported TX beam.

NOTE: Different TX beams reported for different antenna groups can be received simultaneously at the UE.

NOTE: Different TX beams reported for the same UE antenna group may not be possible to be received simultaneously at the UE NR also supports the following beam reporting considering L groups where L>=1 and each group refers to a Rx beam set (Alt1) or a UE antenna group (Alt2) depending on which alternative is adopted. For each group I, UE reports at least the following information:

Information indicating group at least for some cases
Measurement quantities for $N_I$ beam (s)
  Support L1 RSRP and CSI report (when CSI-RS is for CSI acquisition)
Information indicating $N_I$ DL Tx beam(s) when applicable This group based beam reporting is configurable per UE basis. This group based beam reporting can be turned off per UE basis e.g., when L=1 or $N_I$1. Note that no group identifier is reported when it is turned off.

NR supports that UE can trigger mechanism to recover from beam failure. Beam failure event occurs when the quality of beam pair link(s) of an associated control channel falls low enough (e.g. comparison with a threshold, time-out of an associated timer). Mechanism to recover from beam failure is triggered when beam failure occurs. Note that here the beam pair link is used for convenience, and may or may not be used in specification. Network explicitly configures to UE with resources for UL transmission of signals for recovery purpose. Configurations of resources are supported where the base station is listening from all or partial directions, e.g., random access region. The UL transmission/resources to report beam failure can be located in the same time instance as PRACH (resources orthogonal to PRACH resources) or at a time instance (configurable for a UE) different from PRACH. Transmission of DL signal is supported for allowing the UE to monitor the beams for identifying new potential beams.

NR supports beam management with and without beam-related indication. When beam-related indication is provided, information pertaining to UE-side beamforming/receiving procedure used for CSI-RS-based measurement can be indicated through QCL to UE. NR supports using the same or different beams on control channel and the corresponding data channel transmissions.

For NR-PDCCH transmission supporting robustness against beam pair link blocking, UE can be configured to monitor NR-PDCCH on M beam pair links simultaneously, where M≥1 and the maximum value of M may depend at least on UE capability. UE can be configured to monitor NR-PDCCH on different beam pair link(s) in different NR-PDCCH OFDM symbols. Parameters related to UE Rx beam setting for monitoring NR-PDCCH on multiple beam pair links are configured by higher layer signaling or MAC CE and/or considered in the search space design. At least, NR supports indication of spatial QCL assumption between an DL RS antenna port(s), and DL RS antenna port(s) for demodulation of DL control channel. Candidate signaling methods for beam indication for a NR-PDCCH (i.e. configuration method to monitor NR-PDCCH) are MAC CE signaling, RRC signaling, DCI signaling, specification-transparent and/or implicit method, and combination of these signaling methods. Note that indication may not be needed for some cases.

For reception of unicast DL data channel, NR supports indication of spatial QCL assumption between DL RS antenna port(s) and DMRS antenna port(s) of DL data channel. Information indicating the RS antenna port(s) is indicated via DCI (downlink grants). The information indicates the RS antenna port(s) which is QCL-ed with DMRS antenna port(s). Different set of DMRS antenna port(s) for the DL data channel can be indicated as QCL with different set of RS antenna port(s). Note that indication may not be needed for some cases.

3GPP TS 36.300 introduces the mechanism of Activation/Deactivation of SCells as follows:

11.2 Activation/Deactivation Mechanism

To enable reasonable UE battery consumption when CA is configured, an activation/deactivation mechanism of SCells is supported (i.e. activation/deactivation does not apply to PCell). When an SCell is deactivated, the UE does not need to receive the corresponding PDCCH or PDSCH, cannot transmit in the corresponding uplink, nor is it required to perform CQI measurements. Conversely, when an SCell is active, the UE shall receive PDSCH and PDCCH (if the UE is configured to monitor PDCCH from this SCell), and is expected to be able to perform CQI measurements. E-UTRAN ensures that while PUCCH SCell is deactivated, SCells of secondary PUCCH group should not be activated.

The activation/deactivation mechanism is based on the combination of a MAC control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. One deactivation timer is maintained per SCell but one common value is configured per UE by RRC.

At reconfiguration without mobility control information:
  SCells added to the set of serving cells are initially "deactivated";
  SCells which remain in the set of serving cells (either unchanged or reconfigured) do not change their activation status ("activated" or "deactivated").

At reconfiguration with mobility control information (i.e. handover):
  SCells are "deactivated".

In DC, the serving cells of the MCG other than the PCell can only be activated/deactivated by the MAC Control Element received on MCG, and the serving cells of the SCG other than PSCell can only be activated/deactivated by the MAC Control Element received on SCG. The MAC entity applies the bitmap for the associated cells of either MCG or SCG. PSCell in SCG is always activated like the PCell (i.e. deactivation timer is not applied to PSCell). With the exception of PUCCH SCell, one deactivation timer is maintained per SCell but one common value is configured per CG by RRC.

3GPP TS 36.331 describes RRCConnectionReconfiguration and SCell addition or modification as follows:

RRCConnectionReconfiguration

The RRCConnectionReconfiguration message is the command to modify an RRC connection. It may convey information for measurement configuration, mobility control, radio resource configuration (including RBs, MAC main configuration and physical channel configuration) including any associated dedicated NAS information and security configuration.

Signalling radio bearer: SRB1
RLC-SAP: AM
Logical channel: DCCH
Direction: E-UTRAN to UE RRCConnectionReconfiguration Message

```
-- ASN1START
RRCConnectionReconfiguration ::=        SEQUENCE {
    rrc-TransactionIdentifier           RRC-TransactionIdentifier,
    criticalExtensions                  CHOICE {
        c1                                  CHOICE{
            rrcConnectionReconfiguration-r8         RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture            SEQUENCE { }
    }
}
RRCConnectionReconfiguration-r8-IEs ::=   SEQUENCE {
    measConfig                          MeasConfig                          OPTIONAL,    -- Need ON
    mobilityControlInfo                 MobilityControlInfo                 OPTIONAL,    -- Cond HO
    dedicatedInfoNASList                SEQUENCE (SIZE(1..maxDRB)) OF
                                            DedicatedInfoNAS                OPTIONAL,    -- Cond nonHO
    radioResourceConfigDedicated        RadioResourceConfigDedicated        OPTIONAL, -- Cond HO-
toEUTRA
    securityConfigHO                    SecurityConfigHO                    OPTIONAL,    -- Cond HO
    nonCriticalExtension                RRCConnectionReconfiguration-v890-IEs           OPTIONAL
}
RRCConnectionReconfiguration-v890-IEs ::= SEQUENCE {
    lateNonCriticalExtension            OCTET STRING (CONTAINING RRCConnectionReconfiguration-
v8m0-IEs)    OPTIONAL,
    nonCriticalExtension                RRCConnectionReconfiguration-v920-IEs           OPTIONAL
}
-- Late non-critical extensions:
RRCConnectionReconfiguration-v8m0-IEs ::= SEQUENCE {
    -- Following field is only for pre REL-10 late non-critical extensions
    lateNonCriticalExtension            OCTET STRING                        OPTIONAL,
    nonCriticalExtension                RRCConnectionReconfiguration-v10i0-IEs              OPTIONAL
}
RRCConnectionReconfiguration-v10i0-IEs ::= SEQUENCE {
    antennaInfoDedicatedPCell-v10i0     AntennaInfoDedicated-v10i0          OPTIONAL,    -- Need
ON
    -- Following field is only for late non-critical extensions from REL-10
    nonCriticalExtension                SEQUENCE { }                        OPTIONAL
}
-- Regular non-critical extensions:
RRCConnectionReconfiguration-v920-IEs ::= SEQUENCE {
    otherConfig-r9                      OtherConfig-r9                      OPTIONAL,    -- Need ON
    fullConfig-r9                       ENUMERATED {true}                   OPTIONAL,    -- Cond HO-
Reestab
    nonCriticalExtension                RRCConnectionReconfiguration-v1020-IEs          OPTIONAL
}
RRCConnectionReconfiguration-v1020-IEs ::= SEQUENCE {
    sCellToReleaseList-r10              SCellToReleaseList-r10              OPTIONAL,    -- Need ON
    sCellToAddModList-r10               SCellToAddModList-r10               OPTIONAL,    -- Need ON
    nonCriticalExtension                RRCConnectionReconfiguration-v1130-IEs          OPTIONAL
}
RRCConnectionReconfiguration-v1130-IEs ::= SEQUENCE {
    systemInformationBlockType1Dedicated-r11        OCTET STRING (CONTAINING
SystemInformationBlockType1)
        OPTIONAL,   -- Need ON
    nonCriticalExtension                RRCConnectionReconfiguration-v1250-IEs OPTIONAL
}
RRCConnectionReconfiguration-v1250-IEs ::= SEQUENCE {
    wlan-OffloadInfo-r12                CHOICE {
        release                             NULL,
        setup                               SEQUENCE {
            wlan-OffloadConfigDedicated-r12     WLAN-OffloadConfig-r12,
            t350-r12                            ENUMERATED {min5, min10, min20, min30, min60,
                                                min120, min180, spare1}     OPTIONAL    -- Need
OR
        }
    }                                                                       OPTIONAL,    -- Need
ON
    scg-Configuration-r12               SCG-Configuration-r12               OPTIONAL,    -- Cond
nonFullConfig
    sl-SyncTxControl-r12                SL-SyncTxControl-r12                OPTIONAL,    -- Need ON
    sl-DiscConfig-r12                   SL-DiscConfig-r12                   OPTIONAL,    -- Need ON
    sl-CommConfig-r12                   SL-CommConfig-r12                   OPTIONAL,    -- Need ON
    nonCriticalExtension                RRCConnectionReconfiguration-v1310-IEs          OPTIONAL
}
RRCConnectionReconfiguration-v1310-IEs ::= SEQUENCE {
    sCellToReleaseListExt-r13           SCellToReleaseListExt-r13           OPTIONAL,    -- Need ON
```

```
    sCellToAddModListExt-r13           SCellToAddModListExt-r13               OPTIONAL,     -- Need ON
    lwa-Configuration-r13              LWA-Configuration-r13                  OPTIONAL,     -- Need ON
    lwip-Configuration-r13             LWIP-Configuration-r13                 OPTIONAL,     -- Need ON
    rclwi-Configuration-r13            RCLWI-Configuration-r13                OPTIONAL,     -- Need ON
    nonCriticalExtension               RRCConnectionReconfiguration-v14x0-IEs
    OPTIONAL
}
RRCConnectionReconfiguration-v14x0-IEs ::= SEQUENCE {
    sl-V2X-ConfigDedicated-r14         SL-V2X-ConfigDedicated-r14             OPTIONAL,     -- Need ON
    sCellToAddModListExt-v14xy         SCellToAddModListExt-v14xy             OPTIONAL,     -- Need ON
    nonCriticalExtension               SEQUENCE { }                           OPTIONAL
}
PSCellToAddMod-r12 ::=                 SEQUENCE {
    sCellIndex-r12                     SCellIndex-r10,
    cellIdentification-r12             SEQUENCE {
        physCellId-r12                     PhysCellId,
        dl-CarrierFreq-r12                 ARFCN-ValueEUTRA-r9
    }                                                                         OPTIONAL,     -- Cond SCellAdd
    radioResourceConfigCommonPSCell-r12        RadioResourceConfigCommonPSCell-r12 OPTIONAL, -- Cond SCellAdd
    radioResourceConfigDedicatedPSCell-r12     RadioResourceConfigDedicatedPSCell-r12 OPTIONAL, -- Cond SCellAdd2
    ...,
    [[ antennaInfoDedicatedPSCell-v1280        AntennaInfoDedicated-v10i0             OPTIONAL     -- Need ON
    ]],
    [[ sCellIndex-r13                          SCellIndex-r13   OPTIONAL               -- Need ON
    ]]
}
PowerCoordinationInfo-r12 ::= SEQUENCE {
    p-MeNB-r12                         INTEGER (1..16),
    p-SeNB-r12                         INTEGER (1..16),
    powerControlMode-r12               INTEGER (1..2)
}
SCellToAddModList-r10 ::=          SEQUENCE (SIZE (1..maxSCell-r10)) OF SCellToAddMod-r10
SCellToAddModListExt-r13 ::=       SEQUENCE (SIZE (1..maxSCell-r13)) OF SCellToAddModExt-r13
SCellToAddModListExt-v14xy ::=     SEQUENCE (SIZE (1..maxSCell-r13)) OF SCellToAddModExt-v14xy
SCellToAddMod-r10 ::=              SEQUENCE {
    sCellIndex-r10                     SCellIndex-r10,
    cellIdentification-r10             SEQUENCE {
        physCellId-r10                     PhysCellId,
        dl-CarrierFreq-r10                 ARFCN-ValueEUTRA
    }                                                                         OPTIONAL,     -- Cond SCellAdd
    radioResourceConfigCommonSCell-r10         RadioResourceConfigCommonSCell-r10 OPTIONAL, -- Cond SCellAdd
    radioResourceConfigDedicatedSCell-r10      RadioResourceConfigDedicatedSCell-r10  OPTIONAL, -- Cond SCellAdd2
    ...,
    [[ dl-CarrierFreq-v1090                    ARFCN-ValueEUTRA-v9e0          OPTIONAL     -- Cond EARFCN-max
    ]],
    [[ antennaInfoDedicatedSCell-v10i0         AntennaInfoDedicated-v10i0             OPTIONAL     -- Need ON
    ]],
    [[ srs-SwitchFromServCellIndex-r14         INTEGER (0.. 31) OPTIONAL              -- Need ON
    ]]
}
SCellToAddModExt-r13 ::=               SEQUENCE {
    sCellIndex-r13                     SCellIndex-r13,
    cellIdentification-r13             SEQUENCE {
        physCellId-r13                     PhysCellId,
        dl-CarrierFreq-r13                 ARFCN-ValueEUTRA-r9
    }                                                                         OPTIONAL,     -- Cond SCellAdd
    radioResourceConfigCommonSCell-r13         RadioResourceConfigCommonSCell-r10 OPTIONAL, -- Cond SCellAdd
    radioResourceConfigDedicatedSCell-r13      RadioResourceConfigDedicatedSCell-r10  OPTIONAL, -- Cond SCellAdd2
    antennaInfoDedicatedSCell-r13              AntennaInfoDedicated-v10i0             OPTIONAL     -- Need ON
}
SCellToAddModExt-v14xy ::=             SEQUENCE {
    srs-SwitchFromServCellIndex-r14        INTEGER (0.. 31) OPTIONAL              -- Need ON
}
SCellToReleaseList-r10 ::=         SEQUENCE (SIZE (1..maxSCell-r10)) OF SCellIndex-r10
SCellToReleaseListExt-r13 ::=      SEQUENCE (SIZE (1..maxSCell-r13)) OF SCellIndex-r13
SCG-Configuration-r12 ::=          CHOICE {
    release                            NULL,
    setup                              SEQUENCE {
        scg-ConfigPartMCG-r12              SEQUENCE {
```

-continued

```
            scg-Counter-r12              INTEGER (0.. 65535)              OPTIONAL,    -- Need ON
            powerCoordinationInfo-r12    PowerCoordinationInfo-r12        OPTIONAL,    -- Need ON
            ...
        }                                                                 OPTIONAL,    -- Need ON
        scg-ConfigPartSCG-r12            SCG-ConfigPartSCG-r12            OPTIONAL     -- Need ON
    }
}
SCG-ConfigPartSCG-r12 ::=        SEQUENCE {
    radioResourceConfigDedicatedSCG-r12  RadioResourceConfigDedicatedSCG-r12   OPTIONAL,    -- Need ON
    sCellToReleaseListSCG-r12            SCellToReleaseList-r10                OPTIONAL,    -- Need ON
    pSCellToAddMod-r12                   PSCellToAddMod-r12                    OPTIONAL,    -- Need ON
    sCellToAddModListSCG-r12             SCellToAddModList-r10                 OPTIONAL,    -- Need ON
    mobilityControlInfoSCG-r12           MobilityControlInfoSCG-r12            OPTIONAL,    -- Need ON
    ...,
    [[
    sCellToReleaseListSCG-Ext-r13        SCellToReleaseListExt-r13             OPTIONAL,    -- Need ON
    sCellToAddModListSCG-Ext-r13         SCellToAddModListExt-r13              OPTIONAL     -- Need ON
    ]]
}
```

| RRCConnectionReconfiguration field descriptions |
| --- |
| [ . . . ] |
| p-MeNB |
| Indicates the guaranteed power for the MeNB, as specified in TS 36.213 [23]. The value N corresponds to N−1 in TS 36.213 [23]. |
| [ . . . ] |
| p-SeNB |
| Indicates the guaranteed power for the SeNB as specified in TS 36.213 [23, Table 5.1.4.2-1]. The value N corresponds to N−1 in TS 36.213 [23]. |
| [ . . . ] |
| sCellIndex |
| In case of DC, the SCellIndex is unique within the scope of the UE i.e. an SCG cell can not use the same value as used for an MCG cell. For pSCellToAddMod, if sCellIndex-r13 is present the UE shall ignore sCellIndex-r12. sCellIndex-r13 in sCellToAddModListExt-r13 shall not have same values as sCellIndex-r10 in sCellToAddModList-r10. |
| sCellToAddModList, sCellToAddModListExt |
| Indicates the SCell to be added or modified. Field sCellToAddModList is used to add the first 4 SCells with sCellIndex-r10 while sCellToAddModListExt is used to add the rest. If E-UTRAN includes SCellToAddModListExt-v14xy it includes the same number of entries, and listed in the same order, as in SCellToAddModListExt-r13. |
| sCellToAddModListSCG, sCellToAddModListSCG-Ext |
| Indicates the SCG cell to be added or modified. The field is used for SCG cells other than the PSCell (which is added/modified by field pSCellToAddMod). Field sCellToAddModListSCG is used to add the first 4 SCells with sCellIndex-r10 while sCellToAddModListSCG-Ext is used to add the rest. |
| sCellToReleaseListSCG, sCellToReleaseListSCG-Ext |
| Indicates the SCG cell to be released. The field is also used to release the PSCell e.g. upon change of PSCell, upon system information change for the PSCell. |
| scg-Counter |
| A counter used upon initial configuration of SCG security as well as upon refresh of S-$K_{eNB}$. E-UTRAN includes the field upon SCG change when one or more SCG DRBs are configured. Otherwise E-UTRAN does not include the field. |

5.3.10.3b SCell Addition/Modification

The UE shall:

1> for each sCellIndex value included either in the sCellToAddModList or in the sCellToAddModList-SCG that is not part of the current UE configuration (SCell addition):

2> add the SCell, corresponding to the cellIdentification, in accordance with the radioResourceConfig-CommonSCell and radioResourceConfigDedicated-SCell, both included either in the sCellToAddModList or in the sCellToAddModList-SCG;

2> configure lower layers to consider the SCell to be in deactivated state;

2> for each measId included in the measIdList within VarMeasConfig:

3> if SCells are not applicable for the associated measurement; and

3> if the concerned SCell is included in cellsTriggeredList defined within the VarMeasReportList for this measId:
4> remove the concerned SCell from cellsTriggeredList defined within the VarMeasReportList for this measId;
1> for each sCellIndex value included either in the sCellToAddModList or in the sCellToAddModListSCG that is part of the current UE configuration (SCell modification):
2> modify the SCell configuration in accordance with the radioResourceConfigDedicatedSCell, included either in the sCellToAddModList or in the sCellToAddModListSCG;

3GPP TS 36.321 describes the procedure of Activation/Deactivation of SCells as follows:

5.13 Activation/Deactivation of SCells

If the MAC entity is configured with one or more SCells, the network may activate and deactivate the configured SCells. The SpCell is always activated. The network activates and deactivates the SCell(s) by sending the Activation/Deactivation MAC control element described in subclause 6.1.3.8. Furthermore, the MAC entity maintains a sCellDeactivationTimer timer per configured SCell (except the SCell configured with PUCCH, if any) and deactivates the associated SCell upon its expiry. The same initial timer value applies to each instance of the sCellDeactivationTimer and it is configured by RRC. The configured SCells are initially deactivated upon addition and after a handover. The configured SCG SCells are initially deactivated after a SCG change.

The MAC entity shall for each TTI and for each configured SCell:

if the MAC entity receives an Activation/Deactivation MAC control element in this TTI activating the SCell, the MAC entity shall in the TTI according to the timing defined in [2]:
activate the SCell; i.e. apply normal SCell operation including:
SRS transmissions on the SCell;
CQI/PMI/RI/PTI/CRI reporting for the SCell;
PDCCH monitoring on the SCell;
PDCCH monitoring for the SCell;
PUCCH transmissions on the SCell, if configured.
start or restart the sCellDeactivationTimer associated with the SCell;
trigger PHR according to subclause 5.4.6.
else, if the MAC entity receives an Activation/Deactivation MAC control element in this TTI deactivating the SCell; or
if the sCellDeactivationTimer associated with the activated SCell expires in this TTI:
in the TTI according to the timing defined in [2]:
deactivate the SCell;
stop the sCellDeactivationTimer associated with the SCell;
flush all HARQ buffers associated with the SCell.
if PDCCH on the activated SCell indicates an uplink grant or downlink assignment; or
if PDCCH on the Serving Cell scheduling the activated SCell indicates an uplink grant or a downlink assignment for the activated SCell:
restart the sCellDeactivationTimer associated with the SCell;
if the SCell is deactivated:
not transmit SRS on the SCell;
not report CQI/PMI/RI/PTI/CRI for the SCell;
not transmit on UL-SCH on the SCell;
not transmit on RACH on the SCell;
not monitor the PDCCH on the SCell;
not monitor the PDCCH for the SCell;
not transmit PUCCH on the SCell.

HARQ feedback for the MAC PDU containing Activation/Deactivation MAC control element shall not be impacted by PCell interruption due to SCell activation/deactivation [9].

NOTE: When SCell is deactivated, the ongoing Random Access procedure on the SCell, if any, is aborted.

3GPP TS 38.214 provides the introduction about reference signal (e.g. CSI-RS and SRS) as follows:

5.2.1.3 Reference Signal (CSI-RS)

5.2.1.3.1 CSI-RS

The UE can be configured with one or more CSI-RS resource set configuration(s) as indicated by the higher layer parameter ResourceSetConfig Each resource set consists of $K \geq 1$ non-zero power [or zero power transmission power resources].

The following parameters for which the UE shall assume non-zero transmission power for CSI-RS resource are configured via higher layer parameter CSI-RS-ResourceConfig for each CSI-RS resource configuration:

CSI-RS resource configuration identify, defined as CSI-RS-ResourceConfigId.

Number of CSI-RS ports as defined by NrofPorts, where the allowable values are given in, Subclause 7.4.1.5 of TS 38.211 [4].

CSI-RS periodicity and slot offset for periodic/semi-persistent CSI-RS as defined by CSI-RS-timeConfig.

CSI-RS-ResourceMapping, the allowable port mappings are given in Subclause 7.4.1.5 of TS 38.211 [4].

CSI-RS frequency density as defined by CSI-RS-Density, where the allowable values are given in Subclause 7.4.1.5 of TS 38.211 [4].

CDMType parameter, where the allowable values are given in Subclause 7.4.1.5 of TS 38.211 [4].

CSI-RS-FreqBand parameters enabling configuration of wideband and partial band CSI-RS as defined in Subclause 7.4.1.5 of TS 38.211 [4].

Pc: which is the assumed ratio of PDSCH EPRE to non-zero power CSI-RS EPRE when UE derives CSI feedback.

ScramblingID:

[ . . . ]

5.2.2 CSI Reporting Using PUSCH

A UE shall perform aperiodic CSI reporting using PUSCH in slot n+Y on serving cell c upon decoding in slot n an uplink DCI format for serving cell c, where Y is indicated in the decoded uplink DCI. The higher layers-configured CSI Reporting Setting Indication is also indicated in the decoded uplink DCI and the associated CSI Measurement Links and CSI Resource Settings are higher layer configured. An aperiodic CSI report carried on the PUSCH supports wideband, partial band, and sub-band frequency granularities.

CSI reporting on PUSCH can be multiplexed with uplink data on PUSCH. CSI reporting on PUSCH can also be performed without any multiplexing with uplink data from the UE.

Type I CSI feedback is supported for CSI Reporting on PUSCH. Type I subband CSI is supported for CSI Reporting on the PUSCH. Type II CSI is supported for CSI Reporting on the PUSCH.

For Type I CSI feedback on PUSCH, a CSI report comprises up to two parts. The first part contains RI/CRI, CQI for the first codeword. The second part contains PMI and contains the CQI for the second codeword when RI>4.

For Type II CSI feedback on PUSCH, a CSI report comprises up to [two or three—TBD] parts.

5.2.3 CSI Reporting Using PUCCH

A UE is semi-statically configured by higher layers to perform periodic CSI Reporting on the PUCCH. A UE can be configured by higher layers for multiple periodic CSI Reports corresponding to one or more higher layer configured CSI Reporting Setting Indications, where the associated CSI Measurement Links and CSI Resource Settings are higher layer configured. Periodic CSI reporting on [TBD if short of long] PUCCH supports wideband and partial band frequency granularities. Periodic CSI reporting on the PUCCH supports Type I CSI.

A UE shall perform semi-persistent CSI reporting on the PUCCH upon decoding [an uplink DCI format and/or decoding a MAC CE (one or both are TBD)]. The uplink DCI format or the MAC CE will contain one or more CSI Reporting Setting Indications where the associated CSI Measurement Links and CSI Resource Settings are higher layer configured. Semi-persistent CSI reporting on the PUCCH supports Type I CSI. Semi-persistent CSI reporting on the Long PUCCH supports Type I Subband CSI.

For CSI reporting on PUCCH, multiplexing of CSI parameters across more than one slot is not supported.

6.2 UE Reference Symbol (RS) Procedure 6.2.1 UE Sounding Procedure

The UE can be configured with one or more Sounding Reference Symbol (SRS) resource sets as configured by the higher layer parameter SRS-ResourceSetConfig. For each SRS resource set, a UE may be configured with K≥1 SRS resources (higher later parameter SRS-ResourceConfig), where the maximum value of K is indicated by [SRS_capability [13, 38.306]].

A UE shall transmit SRS resources based on the following trigger types:

[trigger type 0: higher layer signalling]
trigger type 1: DCI formats [TBD]

For a UE configured with one or more SRS resource configuration(s), when a UE receives an activation command [MAC spec citation, 38.321] for SRS resource(s) in slot n, the corresponding actions in [MAC spec citation, 38.321] and the UE assumptions on SRS transmission corresponding to the configured SRS resource configuration(s) shall be applied no later than the minimum requirement defined in [10, 38.133 RRM spec].

when a UE receives a deactivation command [MAC spec citation, 38.321] for activated SRS resource(s) in slot n, the corresponding actions in [MAC spec citation, 38.321] and UE assumption on cessation of SRS transmission corresponding to the deactivated SRS resource (s) shall apply no later than the minimum requirement defined in [11, 38.133 RRM spec].

For trigger type 1, at least one state of the DCI field is used to select at least one out of the configured SRS resources.

The following SRS parameters are semi-statically configurable by higher layer parameter SRS-ResourceConfig for [trigger type 0 and] for trigger type 1.

Number of SRS ports as defined by the higher layer parameter NrofSRS-Ports in Subclause 6.4.1.4 of [4] [for trigger type 0 and] trigger type 1.

Time domain behaviour of SRS resource configuration as indicated by the higher layer parameter SRS-ResourceConfigType, which can be periodic, semi-persistent, aperiodic SRS transmission as defined in subclause 6.4.1.4 of [4].

Slot level periodicity and slot level offset as defined by the higher layer parameter SRS-SlotConfig in Subclause 6.4.1.4 of [4].

OFDM symbol location of the SRS resource within a slot including number of OFDM symbols as defined by the higher layer parameter SRS-ResourceMapping in Subclause 6.4.1.4 of [4] [for trigger type 0 and] trigger type 1.

Wideband or Partial band as defined by the higher layer parameter SRS-FreqBand in Subclause 6.4.1.4 of [4] [for trigger type 0 and] trigger type 1.

Transmission comb value and comb offset as defined by the higher layer parameter SRS-TransmissionComb in Subclause 6.4.1.4 of [4] [for trigger type 0 and] trigger type 1.

SRS sequence ID as defined by the higher layer parameter SRS-SequenceId in Subclause 6.4.1.4 of [4] for [trigger type 0 and] trigger type 1.

When SRS and PUCCH with format 1 are transmitted in the same symbol on a given carrier for one UE, regardless of whether there are overlapped REs or not, UE shall transmit SRS and PUCCH with format 1 by TDM if the parameter [PUCCHSRS-SimultaneousTransmission] is TRUE or drop SRS or PUCCH with format 1 if the parameter [PUCCHSRS-SimultaneousTransmission] is FALSE.

3GPP TS 38.211 describes the SS (Synchronization Signal) block as follows:

7.4.3 SS/PBCH Block 7.4.3.1 Time-Frequency Structure of an SS/PBCH Block

In the time domain, an SS/PBCH block consists of 4 OFDM symbols, numbered in increasing order from 0 to 3. In the frequency domain, an SS/PBCH block consists of 24 contiguous resource blocks with the subcarriers numbered in increasing order from 0 to 287, starting with the resource block with the lowest number.

The UE shall assume the sequence of symbols $d_{PSS}$ (0), . . . , $d_{PSS}$ (126) constituting the primary synchronization signal to be scaled by a factor $\beta_{SS}$ to conform to the PSS power allocation specified in [5, TS 38.213] and mapped to resource elements $(k,l)_{p,\mu}$ in increasing order of k where k and l are given by Table 7.4.3.1-1 and represent the frequency and time indices, respectively, within one SS/PBCH block.

The UE shall assume the sequence of symbols $d_{SSS}$ 0, . . . , $d_{SSS}$ (126) constituting the secondary synchronization signal to be scaled by a factor $\beta_{SS}$ to conform to the SSS power allocation specified in [5, TS 38.213] and mapped to resource elements $(k,l)_{p,\mu}$ in increasing order of k where k and l are given by Table 7.4.3.1-1 and represent the frequency and time indices, respectively, within one SS/PBCH block.

The UE shall assume the sequence of complex-valued symbols $d_{PBCH}(0)$, . . . , $d_{PBCH}$ ($M_{symb}$−1) constituting the physical broadcast channel to be scaled by a factor $\beta_{PBCH}$ to conform to the PBCH power allocation specified in [5, TS 38.213] and mapped in sequence starting with $d_{PBCH}(0)$ to resource elements $(k,l)_{p,\mu}$ which meet all the following criteria:

they are not used for PBCH demodulation reference signals

The mapping to resource elements $(k,l)_{p,\mu}$ not reserved for other purposes shall be in increasing order of first the index k and then the index l, where k and l represent the frequency and time indices, respectively, within one SS/PBCH block and are given by Table 7.4.3.1-1.

The UE shall assume the sequence of complex-valued symbols $r_l(0), \ldots, r_l(143)$ constituting the demodulation reference signals for the SS/PBCH block to be scaled by a factor of $\beta_{PBCH}^{DMRS}$ to conform to the PBCH DM-RS power allocation specified in [5, TS 38.213] and mapped to resource elements $(k,l)_{p,\mu}$ in increasing order of first k and then l where k and l are given by Table 7.4.3.1-1 with $v=N_{ID}^{cell}$ mod 4 and represent the frequency and time indices, respectively, within one SS/PBCH block.

For the SS/PBCH block, the UE shall assume
antenna port p=4000,
subcarrier spacing configuration $\mu \in \{0,1,3,4\}$, and
the same cyclic prefix length and subcarrier spacing for the PSS, SSS, and PBCH.

The UE may assume that SS/PBCH blocks transmitted with the same block time index within a SS/PBCH burst set periodicity are quasi co-located with respect to Doppler spread, Doppler shift, average gain, average delay, and spatial Rx parameters. The UE shall not assume quasi co-location for any other SS/PBCH block transmissions.

Table 7.4.3.1-1 of 3GPP TS 38.211 V1.0.0, Entitled "Resources within an SS/PBCH Block for PSS, SSS, PBCH, and DM-RS for PBCH", is Reproduced as FIG. 5

There are some agreements on beam management in RAN1 #88bis meeting, as described in the Final Report of 3GPP TSG RAN WG1 #88bis v1.0.0 (Spokane, USA, 3-7 Apr. 2017) as follows:
Agreements:
For UE RRC connected mode, periodic signal is supported at least for P1 procedure (Tx/Rx beam alignment) using following options in addition to UE-specifically configured CSI-RS. Down selection from following options will be conducted in the next meeting.
Opt. 1: SS blocks
Opt. 2: Cell-specifically configured CSI-RS
Configuration of CSI-RS is obtained from the broadcast message (e.g., MIB, SIB)
Opt. 3: No additional option
There are some agreements on beam management in RAN1 #89 meeting, as described in the Final Report of 3GPP TSG RAN WG1 #89 v1.0.0 (Hangzhou, China, 15-19 May 2017) as follows:
Agreements:
Support spatial QCL assumption between antenna port(s) within a CSI-RS resource(s) and antenna port of an SS Block (or SS block time index) of a cell
The other QCL parameters not precluded
FFS: indication either explicit or implicit or configurable or a default
Note: default assumption may be no QCL
Configuration of QCL for UE specific NR-PDCCH is by RRC and MAC-CE signalling
Note that MAC-CE is not always needed
FFS: necessity of DCI signalling
Note: For example, DL RS QCLed with DMRS of PDCCH for delay spread, Doppler spread, Doppler shift, and average delay parameters, spatial parameters
Agreement: Cell-specifically configured CSI-RS is not supported for beam management Agreements:
NR supports CSI-RS configuration to support Tx and/or Rx beam sweeping for beam management conveying at least the following information
Information related to CSI-RS resource configuration
E.g., CSI-RS RE pattern, number of CSI-RS antenna ports, CSI-RS periodicity (if applicable) etc.
Information related to number of CSI-RS resources
Information related to number of time-domain repetitions (if any) associated with each CSI-RS resource
FFS: details of time-domain repetitions, e.g., signaling for time-domain repetitions may not be explicit
FFS signaling details, e.g., explicit indication vs implicit indication
Note this does not imply particular option (IFDMA or subcarrier scaling or DFT based) for sub time unit partition
FFS: whether different sub-time units have same or different ports
Agreements:
For aperiodic SRS transmission triggered by single aperiodic SRS triggering field, the UE can be configured to transmit N(N>1) SRS resources for UL beam management
FFS transmit power for the N SRS resources for UL beam management
There are some agreements on beam management in RAN1 #90 meeting, as described in the Final Chairman's Note of 3GPP TSG RAN WG1 Meeting #90 (Prague, Czech Republic, 21-25 Aug. 2017) as follows:
Agreements:
Support L1-RSRP reporting of measurements on SS block for beam management procedures
The following configurations for L1-RSRP reporting for beam management are supported
SS block only (with mandatory support by UE)
CSI-RS only (with mandatory support by UE)
SS block+CSI-RS independent L1 RSRP reporting
Joint L1-RSRP using QCL-ed SS-block+CSI-RS is optionally supported by UE (with optionally support by UE)
Agreements:
At least for non-grouping based beam reporting, taking the following parameter values for further consideration
For maximal TX beam numbers for a UE to measure for a given reporting instance: candidate value is, e.g., around K=[64]
For maximal TX beam numbers reported by a UE per reporting instance are, e.g., N=[1, 2, 4, 8]
For L1-RSRP levels, candidate value is, e.g., around [100]
Considering maximal L1-RSRP range, e.g., from X dBm to Y dBm
Considering step-size of L1-RSRP, e.g., Z dB
Companies are encouraged to evaluate/analyze appropriate values considering
P1, P2, and P3 procedures
The values could be different for aperiodic reporting, and semi-persistent/periodic reporting if supported
The values could be different for PUCCH and PUSCH based reporting, if supported
CSI-RS and/or SS-block related measurement/reporting
Agreements:
Support UE to provide information to gNB to assist UL beam management The information can be a number representing the amount of SRS resources required for UE Tx beam training
- FFS the supported number(s), taking into account performance and implementation complexity aspects
- Note: these set of SRS resources are associated with a set of Tx beams FFS: signaling method
- E.g., capability signaling, or msg3, or dynamic signalling FFS: impact of multi-panel FFS: if to support the antenna structure with both omni-directional antenna panel and directional antenna panel, whether or not there is any additional impact To enable reasonable UE battery consumption when CA (Carrier Aggregation) or DC (Dual Connectivity) is configured, an activation/deactivation mechanism of SCell (Secondary Cell) is supported. When an SCell is deactivated, the UE does not need to monitor or receive the corresponding PDCCH (Physical Downlink Control Channel) and/or PDSCH (Physical Downlink Shared Channel), cannot transmit in the corresponding uplink, and is not required to perform CQI (Channel Quality Indicator) measurements. Conversely, when an SCell is activated, the UE could monitor or receive corresponding PDSCH and/or PDCCH (if the UE is configured to monitor PDCCH from this SCell), and is expected to be able to perform CQI measurements.

If the UE is configured with one or more SCells, the network may activate or deactivate the configured SCell(s), e.g. by sending an SCell Activation/Deactivation MAC (Medium Access Control) CE (Control Element). If a UE receives an SCell Activation/Deactivation MAC CE from the network to activate an SCell, the UE may need to apply some operation on the activated SCell. For example, for DL (Downlink), the UE may apply PDCCH monitoring on the activated SCell. However, in NR (New Radio), the network may perform (or transmit) DL transmission via beamforming technique, i.e. the network may transmit DL signaling via a specific network beam(s) on a specific direction. Thus, the UE may need to know how to monitor PDCCH on the activated SCell, e.g. via which network beam(s) and/or UE beam(s). In addition, the UE may need to know how to perform (or receive) DL data transmission (e.g. PDSCH transmission) on the activated SCell.

Figure 6:
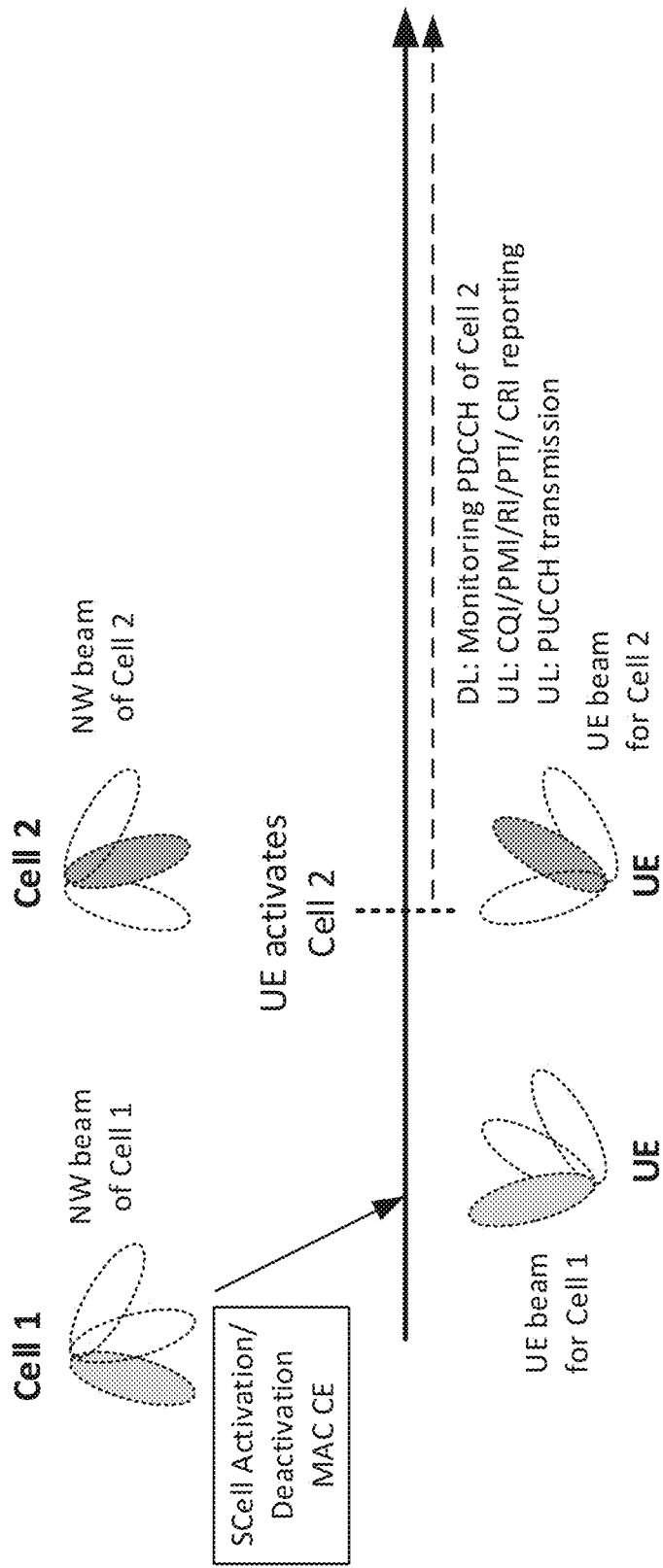
FIG. 6 illustrates an example of activating an SCell (Secondary Cell) according to one embodiment.

On the other hand, for UL (Uplink), the UE may apply PUCCH (Physical Uplink Control Channel) transmission, e.g. for CQI reporting (e.g. to transmit CQI report) and/or scheduling request, (or reference signal transmission, e.g. SRS (Sounding Reference Signal)) on the activated SCell. The UE may need to determine how to perform (or transmit) PUCCH transmission, PUSCH (Physical Uplink Shared Channel) transmission and/or reference signal transmission, e.g. via which network beam(s) and/or UE beam(s). Furthermore, UE beam(s) for PDCCH monitoring, PUCCH transmission, and/or reference signal transmission on the activated SCell needs to be determined if the UE use beamforming to generate UE beam(s). FIG. 6 illustrates an example of activating an SCell.

Figure 13:
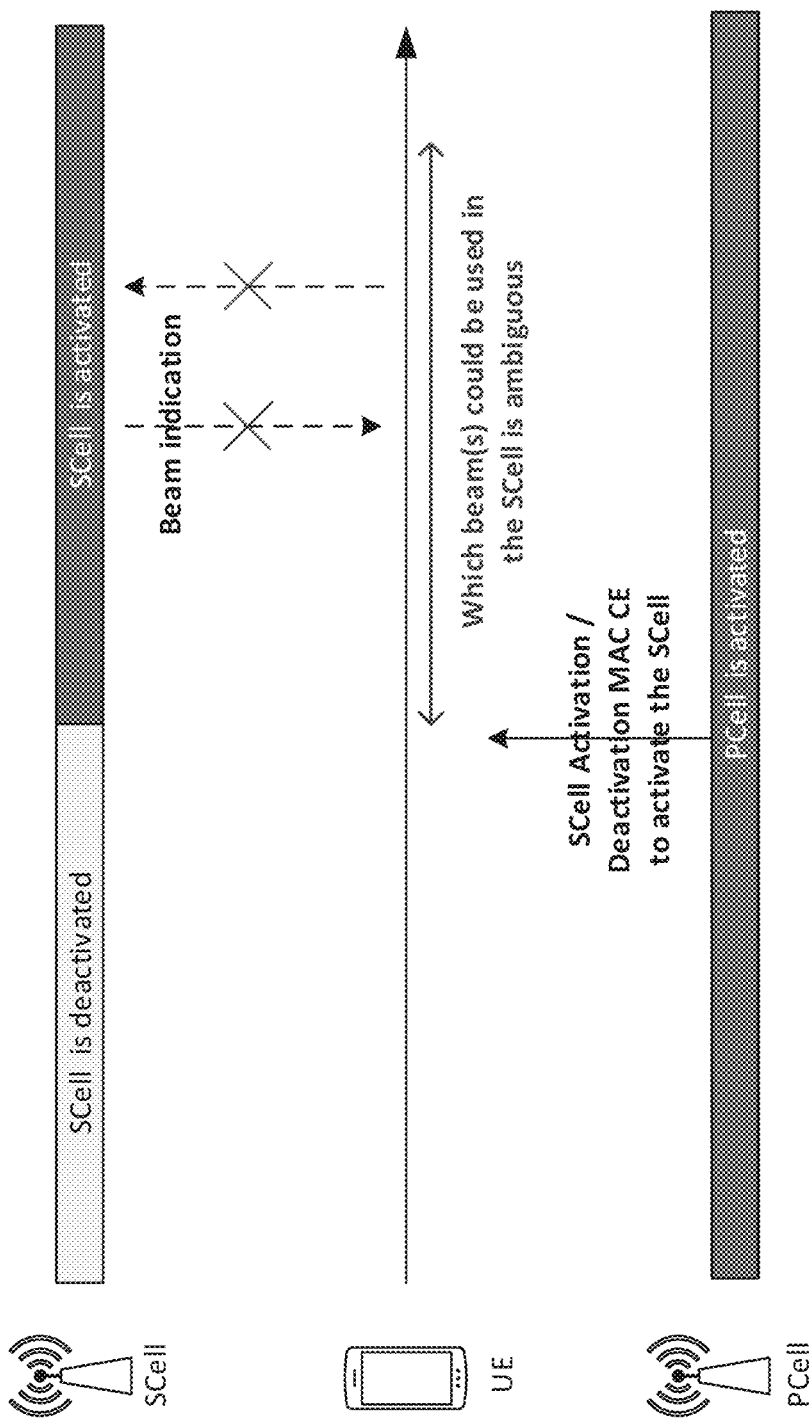
FIG. 13 is a diagram according to one embodiment.

As another example shown in FIG. 13, assuming that a UE is configured with at least two serving cells, including a PCell which is activated and an SCell which is deactivated. When the UE receives an SCell Activation/Deactivation MAC CE (via the PCell) to activate the SCell, which beam(s) could be used for DL transmission and/or UL transmission in the SCell may be ambiguous. Without exact beam information, any DL transmission or UL transmission (e.g. beam indication, data transmission, etc.) in the SCell may be failed. Thus, the network could not transmit the beam indication via the SCell in this situation.

Assuming that the UE is configured with at least two serving cells including a first serving cell (e.g. PCell or PSCell) and a second serving cell (e.g. SCell), wherein the first serving cell is activated and the second serving cell is deactivated. In order for the UE to understand the network beam(s) and/or the UE beam(s) to be used in the second serving cell after the second serving cell is activated, the network can transmit a beam indication to the UE. The beam indication can be used to derive which network beam(s) and/or UE beam(s) to be used in the second serving cell. The UE can follow the beam indication to perform (e.g. receive and/or transmit) DL and/or UL transmission on the second serving cell once the second serving cell is activated.

Figure 7:
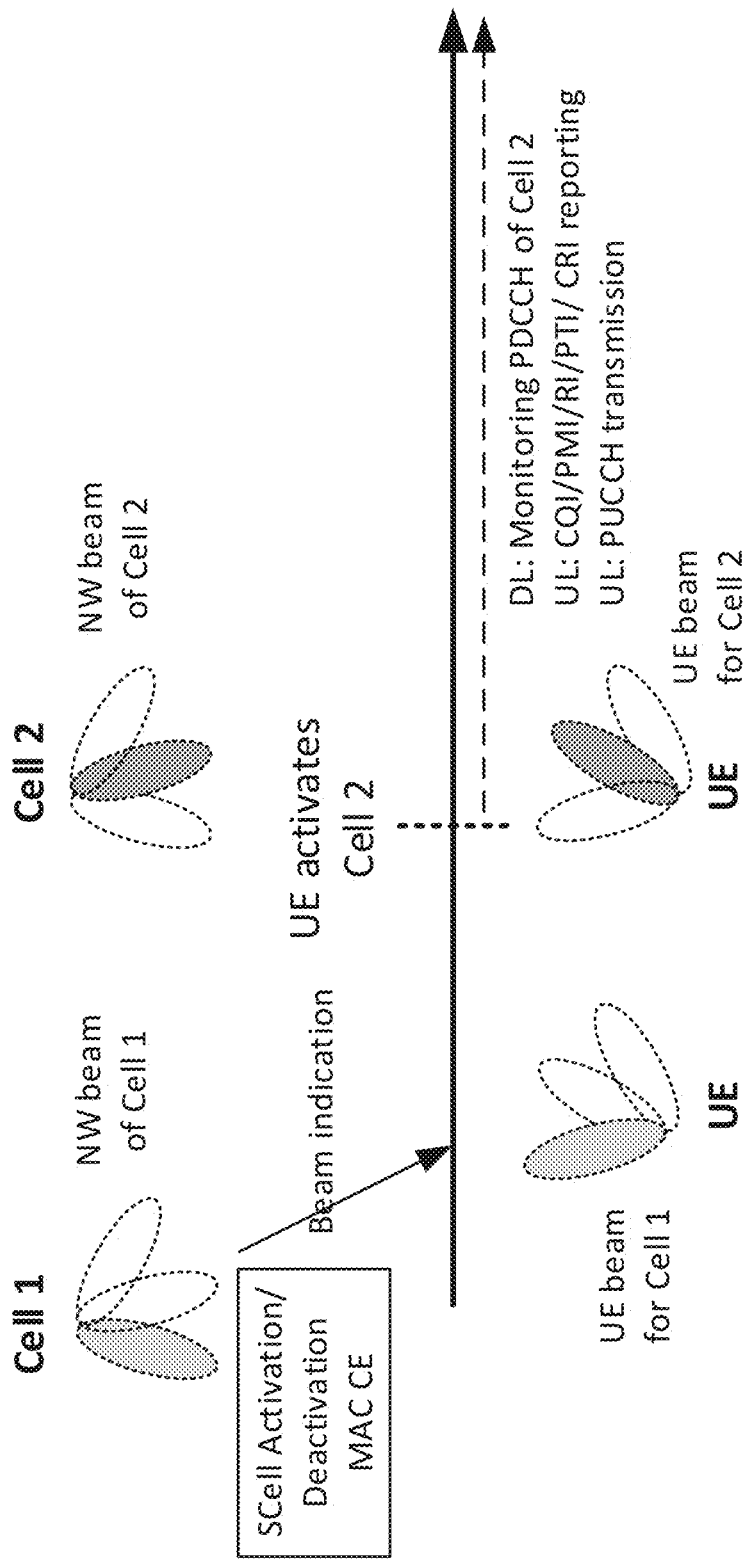
FIG. 7 shows an example of determining the network beam(s) and/or UE beam(s) according to one embodiment.

The network may provide the beam indication when transmitting the SCell Activation/Deactivation MAC CE to the UE. When the network transmits the SCell Activation/Deactivation MACE CE to the UE to activate an SCell, the network may transmit a beam indication to the UE without triggering beam report. The network could determine the network beam(s) and/or the UE beam(s) for the SCell to the UE based on the measurement result of periodic beam report from the UE. In one embodiment, the beam indication may be transmitted together with the SCell Activation/Deactivation MAC CE. Alternatively, the beam indication and the SCell Activation/Deactivation MAC CE can be transmitted individually. FIG. 7 shows an example of determining the network beam(s) and/or UE beam(s).

Figure 8:
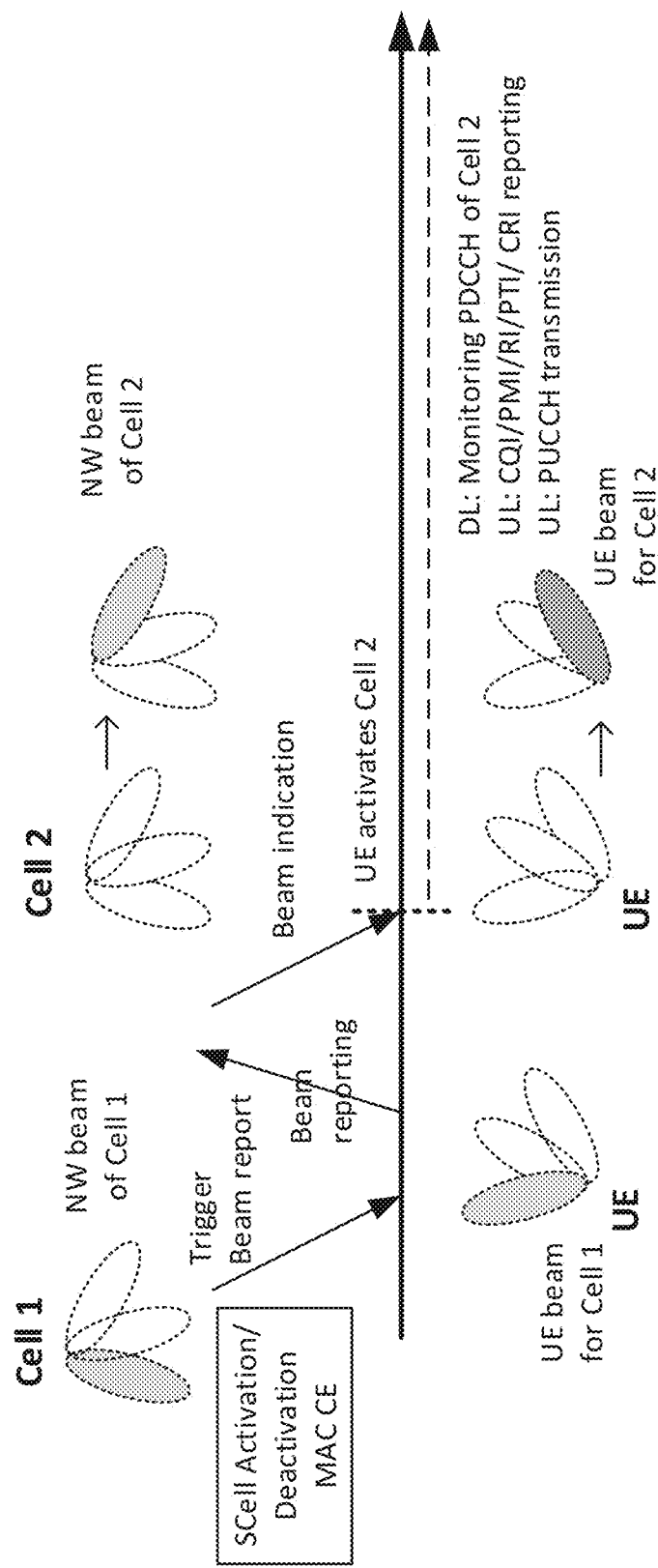
FIG. 8 shows an example of determining the network beam(s) and/or UE beam(s) according to one embodiment.

The network may provide the beam indication after transmitting SCell Activation/Deactivation MAC CE to the UE. The network may trigger the UE to report (or feedback) information of beam measurement for the activated SCell. After the UE reports (or feedbacks) the information of beam measurement (e.g. beam reporting), the network could transmit a beam indication to the UE. Then the UE could follow the beam indication to perform (e.g. receive and/or transmit) DL and/or UL transmission on the activated SCell. FIG. 8 shows an example of determining the network beam(s) and/or UE beam(s) by triggering beam report when transmitting the SCell Activation/Deactivation MAC CE.

The UE may not activate the SCell upon receiving the SCell Activation/Deactivation MAC CE, e.g. if the UE does not know which serving beams could be used. The UE may activate the SCell upon receiving the beam indication after receiving the SCell Activation/Deactivation MAC CE.

Figure 9:
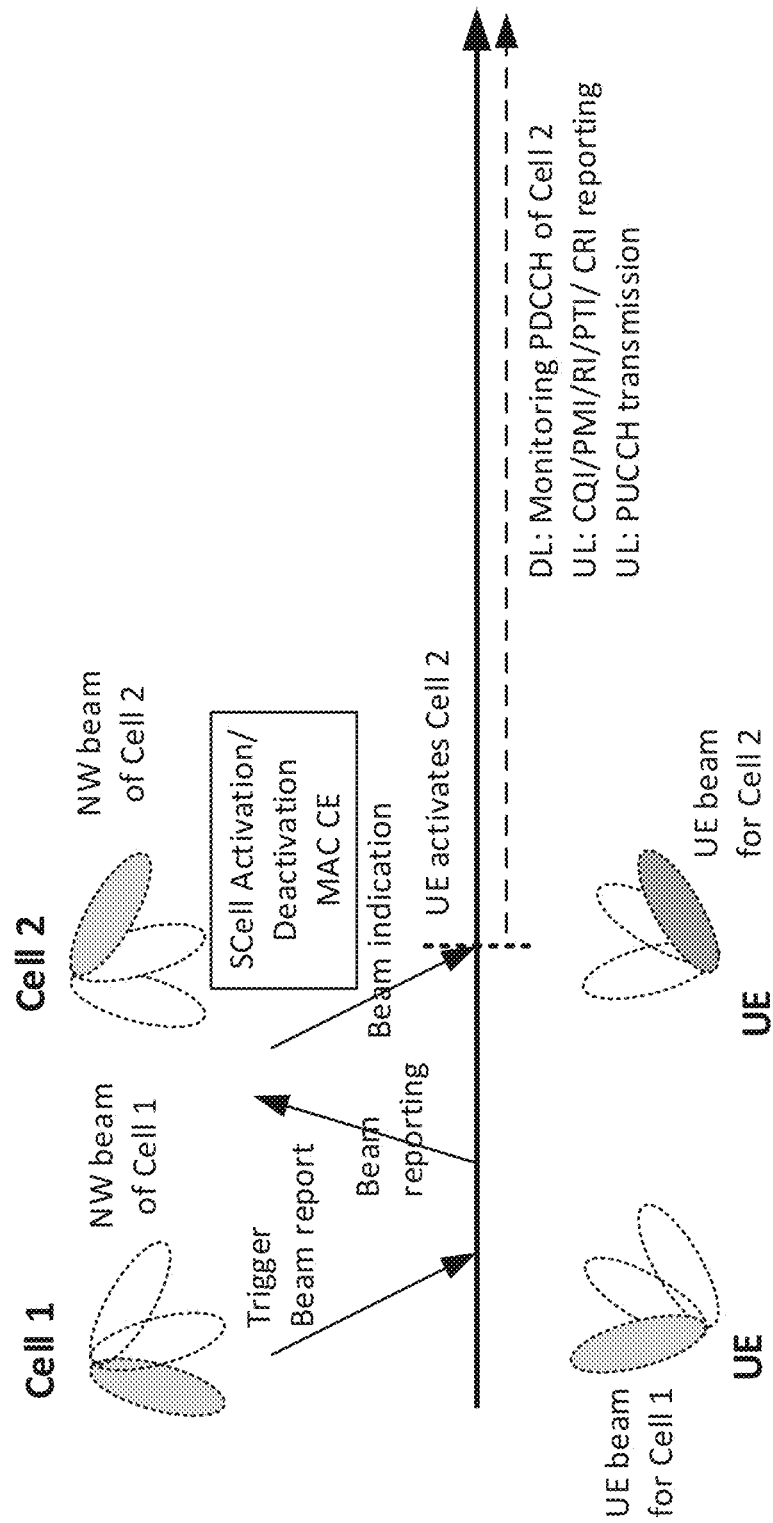
FIG. 9 shows an example of determining the network beam(s) and/or UE beam(s) according to one embodiment.

The network may trigger the UE to report (or feedback) information of beam measurement of an SCell which is deactivated. After the UE reports (or feedbacks) the information of beam measurement, the network could determine whether to activate the SCell. If the network wants to activate the SCell, the network may transmit the SCell Activation/Deactivation MAC CE and transmit a beam indication to the UE. In one embodiment, the SCell Activation/Deactivation MAC CE and the beam indication may be transmitted together or separately. FIG. 9 shows an example of determining the network beam(s) and/or UE beam(s) by triggering beam report before transmitting the SCell Activation/Deactivation MAC CE.

The signaling to trigger beam report may be the same signaling to transmit the SCell Activation/Deactivation MAC CE. The SCell Activation/Deactivation MAC CE may implicitly trigger beam report. The signaling to trigger beam report may be transmitted before the SCell Activation/Deactivation MAC CE, or after the SCell Activation/Deactivation MAC CE. The signaling to trigger beam report may be transmitted via an SCell which is previously activated. Furthermore, the signaling to trigger beam report may be transmitted via the PCell, PSCell, or SCell.

In one embodiment, the signaling to trigger beam report may include information of cell (e.g. cell index). The signaling to trigger beam report may indicate that the UE could report on which cell. Furthermore, the signaling to trigger beam report may indicate the UE could perform beam reporting (e.g. transmit beam report) on which cell.

In one embodiment, the signaling to trigger beam report may be transmitted via the cell which transmitted the SCell Activation/Deactivation MAC CE, or via the cell which is activated after the UE receiving the SCell Activation/Deactivation MAC CE. Furthermore, the signaling to trigger beam report may be transmitted via the cell which is not the cell transmitted the SCell Activation/Deactivation MAC CE, and not the cell which is activated after the UE receiving the SCell Activation/Deactivation MAC CE.

In one embodiment, the beam measurement may be triggered when the UE receives the indication to trigger beam report, or when the UE receives the SCell Activation/Deactivation MAC CE. For example, when the UE receives a signaling of beam report, the UE may perform the beam measurement. Then the UE could report beam information based on the beam measurement.

In one embodiment, the beam reporting may include an index of cell (e.g. sCellIndex) to indicate, for example, the content of the beam reporting is for which cell. The beam reporting may include a CQI, PMI (Pre-coding Matrix Indicator), RI (Rank Indicator), PTI (Precoding Type Indicator), and/or CRI (CSI-RS Resource Index) report. Furthermore, the beam reporting may include beam information of the SCell which will be activated, wherein the index of the SCell may be indicated via the signaling to trigger beam reporting. In addition, the beam reporting may include beam information (e.g. index associated with beam, and/or RSRP) of the cell(s) which is measured by the UE.

In one embodiment, the beam reporting may be transmitted on the cell which triggered the beam report, on the cell which transmitted the SCell Activation/Deactivation MAC CE, or on the cell which is activated after the UE receiving the SCell Activation/Deactivation MAC CE. Furthermore, the beam reporting may be transmitted via the cell which is not the cell transmitted the SCell Activation/Deactivation MAC CE and not the cell which is activated after the UE receiving the SCell Activation/Deactivation MAC CE.

In one embodiment, the beam indication could indicate the UE which network beam(s) and/or UE beam(s) could be used for DL and/or UL transmission. The beam indication may include information of network and/or UE beam(s). The beam indication may include an index of cell (e.g. sCellIndex) to indicate, for example, the beam indication is from which cell and/or to indicate the beam indication is for which cell.

In one embodiment, the beam indication may comprise an indicator of SS block(s), an indicator of CSI-RS, an indicator of SRS, and/or an indicator of beam reference signal. The beam indication may be transmitted via the cell which transmitted the SCell Activation/Deactivation MAC CE, the cell which transmitted the signaling to trigger beam report, or the cell which is the activated cell. The beam indication may be transmitted via any SCell which is previously activated, or via the PCell, PSCell, and/or SCell.

Figure 10:
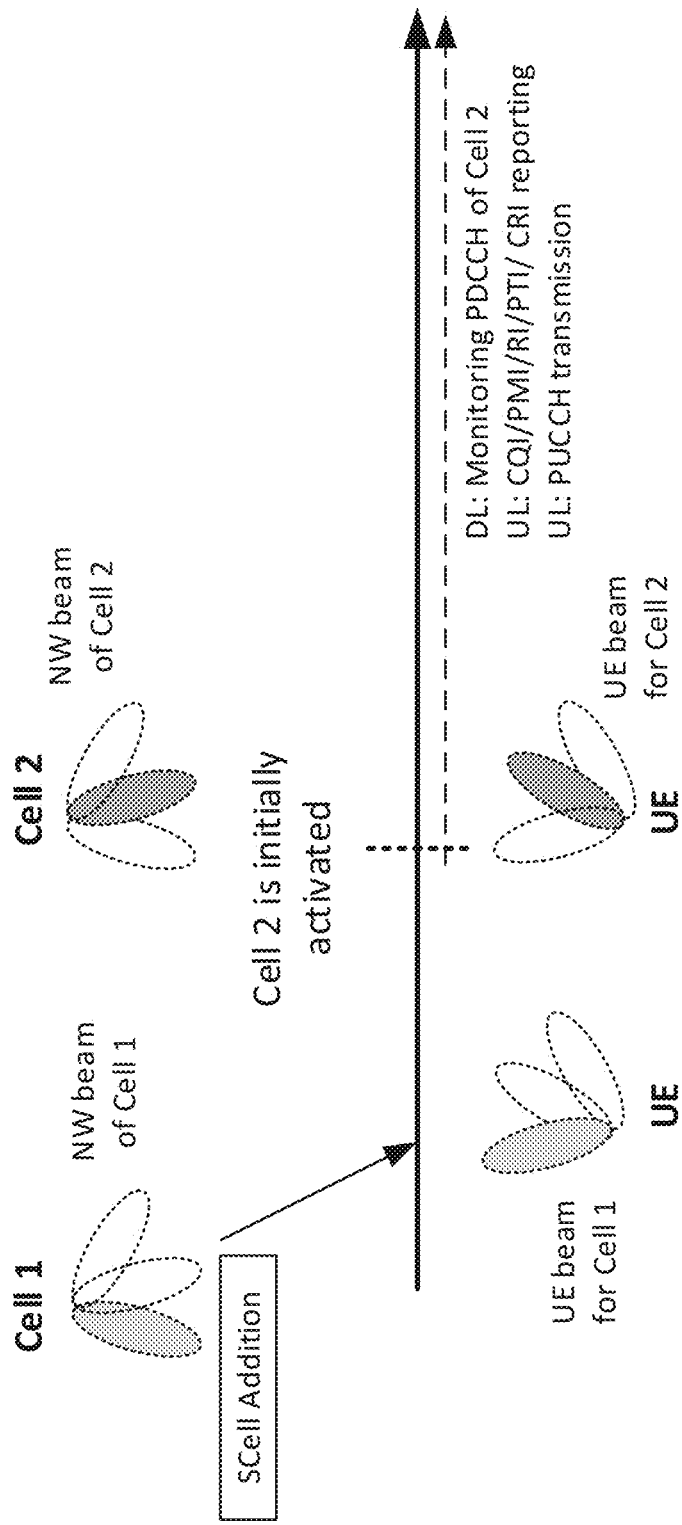
FIG. 10 illustrates an example of adding an SCell which is initially activated according to one embodiment.

In addition, if an SCell is added (e.g. via the RRC configuration) to the set of serving cells are initially "activated" (e.g. specified in 3GPP specification or configured by RRC), the UE may need to apply some operations on the newly added SCell. For example, for DL, the UE may perform PDCCH monitoring on the added SCell. For UL, the UE may perform PUCCH transmission, e.g. for CQI reporting (e.g. to transmit CQI report) and/or scheduling request (or reference signal transmission, e.g. SRS) on the added SCell. Therefore, the UE may need to determine how to perform (e.g. receive and/or transmit) the DL and/or UL transmission, e.g. via which network beam(s) for the SCell when the SCell is added and initially activated. Furthermore, the UE beam(s) for PDCCH monitoring, PUCCH transmission, and/or reference signal transmission on the added SCell needed to be determined if the UE use beamforming to generate UE beam(s). FIG. 10 illustrates an example of adding an SCell which is initially activated.

Figure 11:
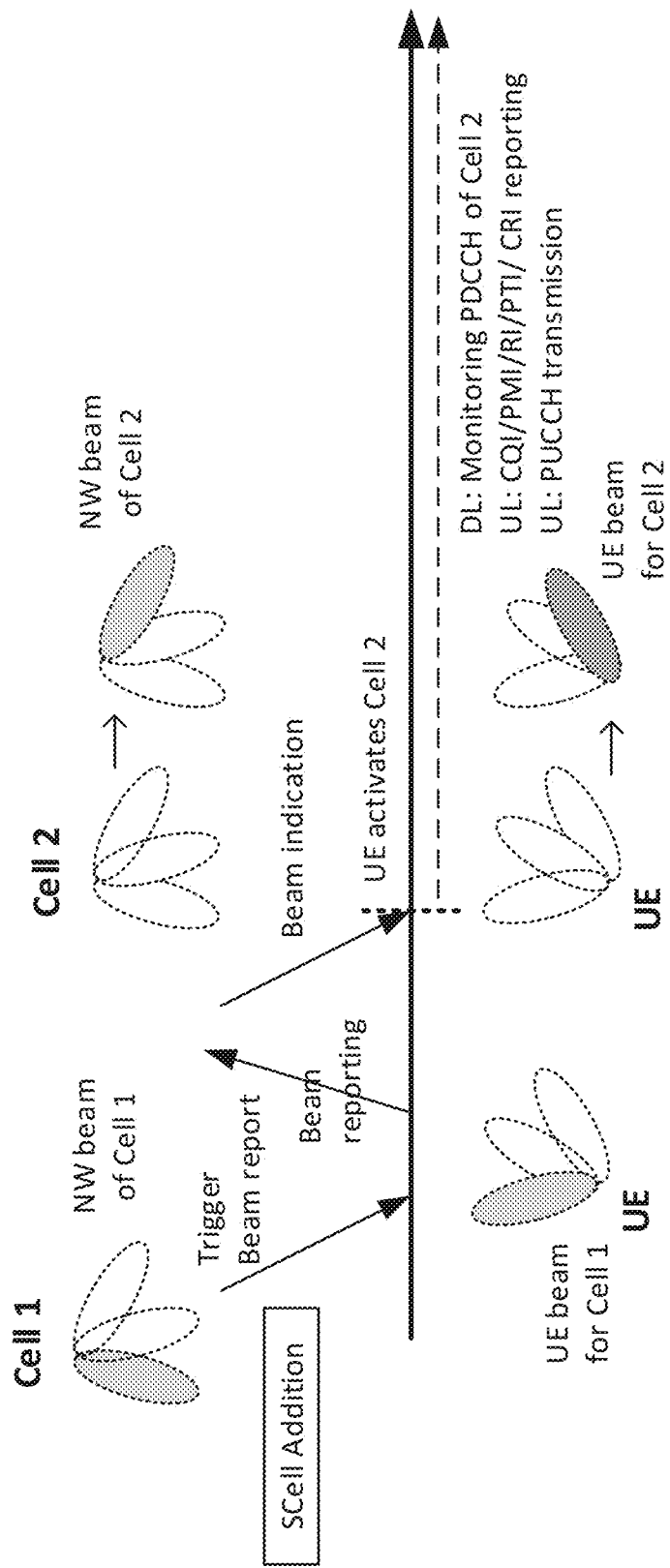
FIG. 11 shows an example of determining the network beam(s) and/or UE beam(s) according to one embodiment.

In order to determine the network beam(s) and/or UE beam(s) for communicating with an SCell when the SCell is added and initially activated, the network may trigger the UE to report (or feedback) information of beam measurement, e.g. reference signal measurement report. After the UE reports (or feedbacks) the information of beam measurement (e.g. beam reporting), the network could indicate a beam indication to the UE. Then the UE could follow the beam indication to perform (e.g. receive and/or transmit) the DL and/or UL transmission on the added SCell. FIG. 11 shows an example of determining the network beam(s) and/or UE beam(s) by triggering beam report when transmitting a signaling for SCell addition.

Figure 12:
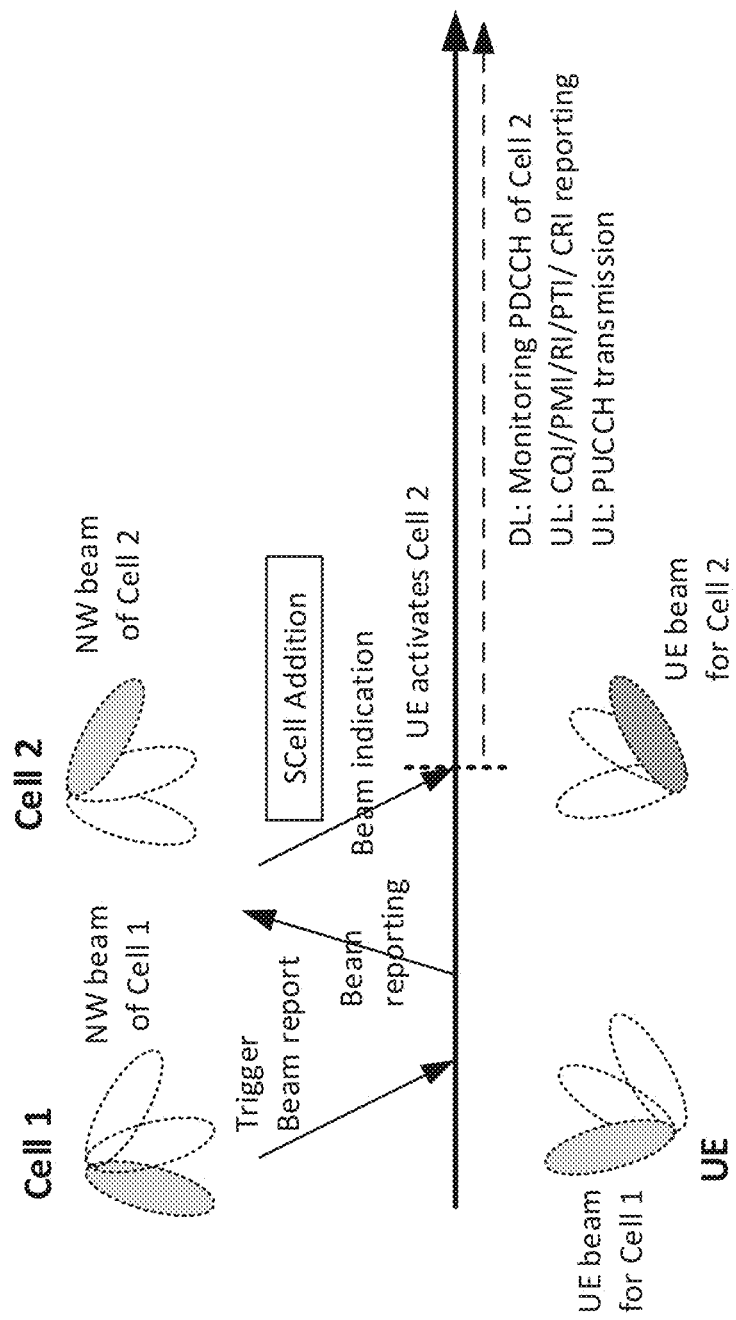
FIG. 12 shows an example of determining the network beam(s) and/or UE beam(s) according to one embodiment.

The network may trigger the UE to report (or feedback) information of beam measurement of a cell which may be added to be an SCell by the network. After the UE reports (or feedbacks) the information of beam measurement (e.g. beam reporting), the network could determine whether to add the SCell. If the network wants to add the SCell, the network may transmit the SCell addition indication and indicate a beam indication to the UE. In one embodiment, the signaling for SCell addition and the beam indication may be transmitted together or separately. FIG. 12 shows an example of determining the network beam(s) and/or UE beam(s) by triggering beam report before transmitting a signaling for SCell addition.

In one embodiment, the signaling to trigger beam report may be the signaling to transmit the SCell addition. The signaling for SCell addition may implicitly trigger beam report. The signaling to trigger beam report may be transmitted before the signaling for SCell addition, or after the signaling for SCell addition. The signaling to trigger beam report may be transmitted via any SCell which is previously added, or via the PCell, PSCell, and/or SCell. The signaling to trigger beam report may include information of cell (e.g. cell index). The signaling to trigger beam report may indicate the UE could report on which cell. The signaling to trigger beam report may indicate the UE could perform beam reporting (e.g. transmit beam report) on which cell. The signaling to trigger beam report may be transmitted via the cell which transmitted the signaling for SCell addition. The signaling to trigger beam report may be transmitted via the cell which is activated after the UE receiving the signaling for SCell addition. The signaling to trigger beam report may be transmitted via the cell which is not the cell transmitted the signaling for SCell addition and not the cell which is activated after the UE receiving the signaling for SCell addition.

In one embodiment, the beam measurement may be triggered when the UE receives the indication to trigger beam report, or when the UE receives the signaling for SCell addition. For example, when the UE receives a signaling of beam report, the UE may perform the beam measurement. Then the UE could report beam information based on the beam measurement.

In one embodiment, the beam reporting may include an index of cell (e.g. sCellIndex) to indicate, for example, the content of the beam reporting is for which cell. The beam reporting may include a CQI, PMI, RI, PTI, and/or CRI report. Furthermore, the beam reporting may include beam information of the SCell which will be added, wherein the index of the SCell may be indicated via the signaling to trigger beam reporting. The beam reporting may include beam information (e.g. index associated with beam, and/or RSRP) of the cell(s) which is measured by the UE. The beam reporting may be transmitted on the cell which triggered the beam report, the cell which transmitted the signaling for SCell addition, or the cell which is activated after the UE receiving the signaling for SCell addition. In one embodiment, the beam reporting may be transmitted via the cell which is not the cell transmitted the signaling for SCell addition and not the cell which is activated after the UE receiving the signaling for SCell addition.

In one embodiment, the beam indication could indicate the UE which network beam(s) and/or UE beam(s) could be used for DL and/or UL transmission. The beam indication may include information of network and/or UE beam(s). The beam indication may include an index of cell (e.g. sCellIndex) to indicate, for example, the beam indication is from which cell and/or to indicate the beam indication is for which cell. The beam indication may comprise an indicator of SS block(s), an indicator of CSI-RS, an indicator of SRS, or an indicator of beam reference signal.

In one embodiment, the beam indication may be transmitted via the cell which transmitted the signaling for SCell addition, the cell which transmitted the signaling to trigger beam report, or the cell which is the newly added cell. The beam indication may be transmitted via any SCell which is previously added, or the PCell, PSCell, and/or SCell.

Figure 14:
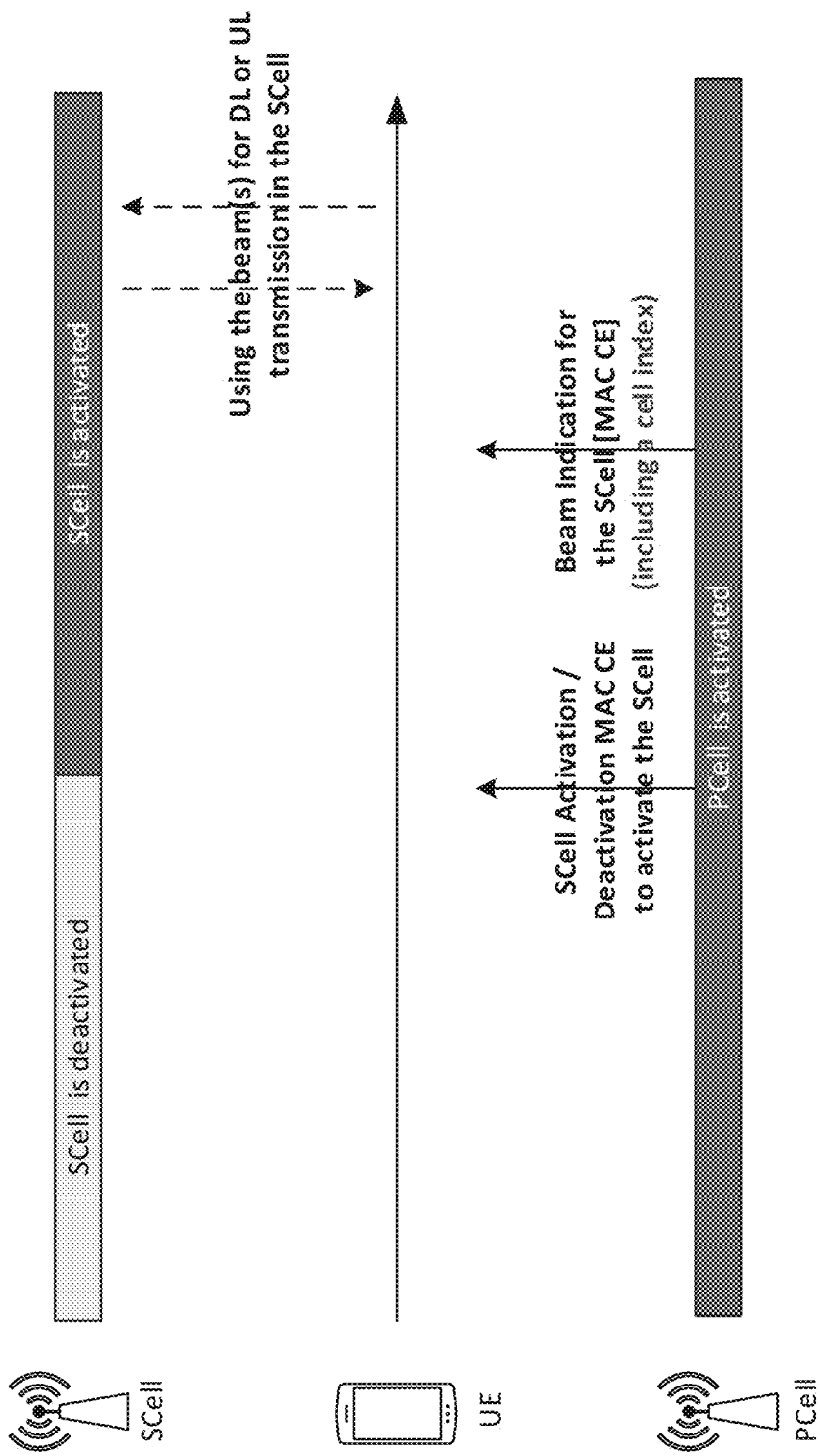
FIG. 14 is a diagram according to one embodiment.

On the other hand, in order to transmit beam indication to the UE to indicate exact beam information for the SCell (e.g. upon the SCell is activated), the network could transmit the beam indication via the activated serving cell (e.g. PCell and/or other activated SCell). Therefore, the beam indication may further include cell index(s), which may be used to indicate the beam indication is for which cell(s). With the cell index, the network can transmit the beam indication to the UE via any serving cell(s), e.g. cross-cell beam indication. For example, in FIG. 14, the UE could receive the beam indication (including cell index) via the PCell, and the beam indication could be used to indicate beam information for the SCell. Thus, the UE could use the beam(s) for DL transmission or UL transmission in the SCell based on the beam indication.

In one embodiment, the beam indication may be transmitted via PHY signaling (e.g. DCI), MAC signaling (e.g. MAC control element), and/or RRC signaling (e.g. RRC configuration message). The beam indication may include an indicator of beam(s) (e.g. beam index) and/or a bitmap of beams (e.g. activation/activation for beams). The indicator of beam(s) may be used to indicate (or derive) which beam(s) could be used for DL transmission and/or UL transmission. The bitmap of beams may be used to indicate (or derive) one or multiple beam(s) could be used (or activated/deactivated) for DL transmission and/or UL transmission. In one embodiment, the beam indication may be used to indicate (or derive) the beam(s) for DL transmission or UL transmission based on the (RRC) configuration for beam(s).

More specifically, whether the network triggers beam report for an SCell may be based on whether uplink of the UE in the SCell is synchronized or not. For example, if uplink of the UE in the SCell is synchronized, the network may trigger the UE to transmit beam report. As another example, if uplink of the UE in the SCell is not synchronized, the network may not trigger the UE to transmit beam report. In one embodiment, if uplink of the UE in the SCell is not synchronized, the network may trigger a random access procedure on the UE for the SCell.

In one embodiment, whether the network triggers beam report for an SCell to a UE may not be based on whether uplink of the UE in the SCell is synchronized or not. For example, the network may trigger beam report for an SCell to a UE when uplink of the UE in the SCell is synchronized. As another example, the network may trigger beam report for an SCell to a UE when uplink of the UE in the SCell is not synchronized.

In one embodiment, whether the UE triggers beam report for an SCell when receiving the signal to trigger beam report for the SCell from network may be based on whether uplink of the UE in the SCell is synchronized or not. For example, if uplink of the UE in the SCell is synchronized, the UE may trigger beam port (e.g. measuring reference signal and transmitting beam reporting). As another example, if uplink of the UE in the SCell is not synchronized, the UE may not trigger beam report. In one embodiment, if uplink of the UE in the SCell is not synchronized, even if the UE receive the signaling to trigger beam report, the UE may not perform beam report procedure.

In one embodiment, whether the UE trigger beam report for an SCell when receiving the signal to trigger beam report for the SCell from network may not base on whether uplink of the UE in the SCell is synchronized or not. For example, the UE may trigger beam report for an SCell when uplink of the UE in the SCell is synchronized. As another example, the UE may trigger beam report for an SCell when uplink of the UE in the SCell is not synchronized.

In one embodiment, the signaling to trigger beam report and the beam indication are individually received by the UE. For example, the UE may receive the signaling to trigger beam report, but may not receive the beam indication. As another example, the UE may receive the beam indication without beam reporting. As another example, the UE may receive the signaling to trigger beam report, then may transmit beam report, and then may receive the beam indication.

In one embodiment, the signaling to trigger beam report and the beam indication may be transmitted by different cells. Alternatively, the signaling to trigger beam report and the beam indication may be transmitted by the same cell.

In one embodiment, the UE mentioned above could be the UE with beamforming capability or the UE without UE beamforming capability. The UE may select SS block and/or CSI-RS for beam reporting, e.g. the UE may select the strongest beam pair link or beam(s). The UE may perform beam sweeping to receive the beam indication.

In one embodiment, the network (e.g. the activated and/or added SCell) may perform beam sweeping to receive the beam report. More specifically, the network beam(s) may be associated with DL broadcast signal (e.g. SS block), DL reference signal (e.g. CSI-RS), and/or UL reference signal (e.g. SRS). In one embodiment, the network beam(s) may be composed of network Rx beam(s) and/or network Tx beam(s). The network beam(s) may be composed of network DL beam(s) and/or network UL beam(s).

In one embodiment, the UE beam(s) may be associated with DL broadcast signal (e.g. SS block), DL reference signal (e.g. CSI-RS), and/or UL reference signal (e.g. SRS). The UE beam(s) may be composed of UE Rx beam(s) and/or UE Tx beam(s), or of UE DL beam(s) and/or UE UL beam(s).

Figure 15:
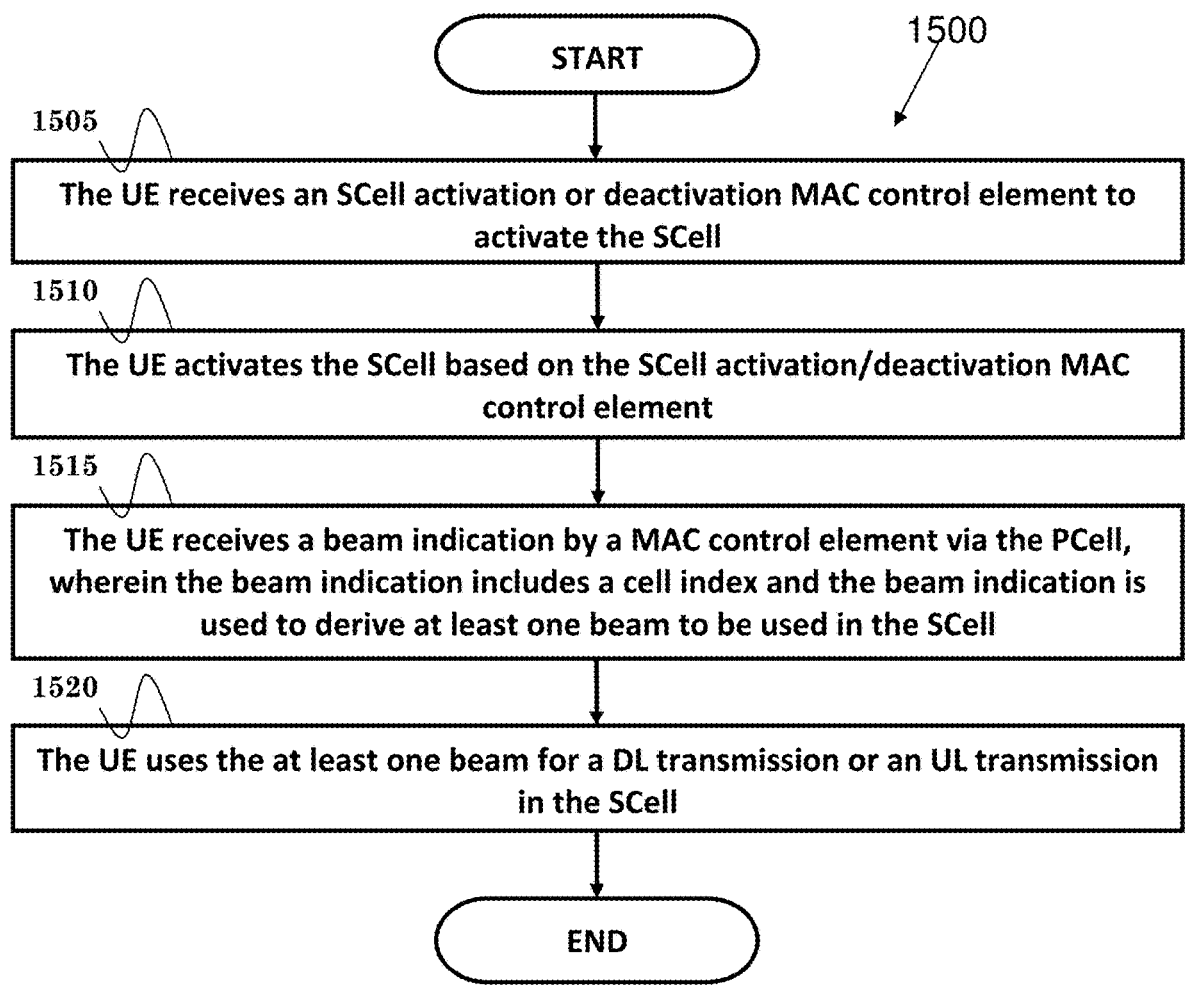
FIG. 15 is a flow chart according to one exemplary embodiment.

FIG. 15 is a flow chart 1500 according to one exemplary embodiment from the perspective of a UE configured with at least two serving cells, including a PCell which is activated and an SCell which is deactivated. In step 1505, the UE receives an SCell activation/deactivation MAC (Medium Access Control) control element to activate the SCell. In step 1510, the UE activates the SCell based on the SCell activation/deactivation MAC control element. In step 1515, the UE receives a beam indication by a MAC control element via the PCell, wherein the beam indication includes a cell index and the beam indication is used to derive at least one beam to be used in the SCell. In step 1620, the UE uses the at least one beam for a DL (Downlink) transmission or an UL (Uplink) transmission in the SCell.

In one embodiment, the DL transmission could include at least one of PDCCH (Physical Downlink Control Channel) transmission and PDSCH (Physical Downlink Shared Channel) transmission. In other words, using the at least one beam for the DL transmission could include monitoring PDCCH via the at least one beam. Alternatively or additionally, using the at least one beam for the DL transmission could include receiving PDSCH transmission via the at least one beam.

In one embodiment, the UL transmission could include at least one of PUCCH (Physical Uplink Control Channel) transmission, CQI (Channel Quality Indicator) report transmission, scheduling request, reference signal transmission, and PUSCH (Physical Uplink Shared Channel) transmission. In other words, using the at least one beam for the UL transmission could include (i) transmitting PUCCH via the at least one beam, (ii) reporting CQI via the at least one beam, (iii) transmitting scheduling request via the at least one beam, (iv) transmitting reference signal (such as SRS) via the at least one beam, and/or (v) transmitting PUSCH via the at least one beam.

In one embodiment, the cell index could indicate that the beam indication is for which cell (such as the SCell). The at least one beam could be network beam(s) or UE beam(s).

Referring back to FIGS. 3 and 4, in one exemplary embodiment of a UE configured with at least two serving cells, including a PCell which is activated and an SCell which is deactivated, the device 300 includes a program code 312 stored in the memory 310. The CPU 308 could execute program code 312 to enable the UE (i) to receive an SCell activation/deactivation MAC control element to activate the SCell, (ii) to activate the SCell based on the SCell activation/deactivation MAC control element, (iii) to receive a beam indication by a MAC control element via the PCell, wherein the beam indication includes a cell index and the beam indication is used to derive at least one beam to be used in the SCell, and (iv) to use the at least one beam for a DL transmission or an UL transmission in the SCell. Furthermore, the CPU 308 can execute the program code 312 to perform all of the above-described actions and steps or others described herein.

Figure 16:
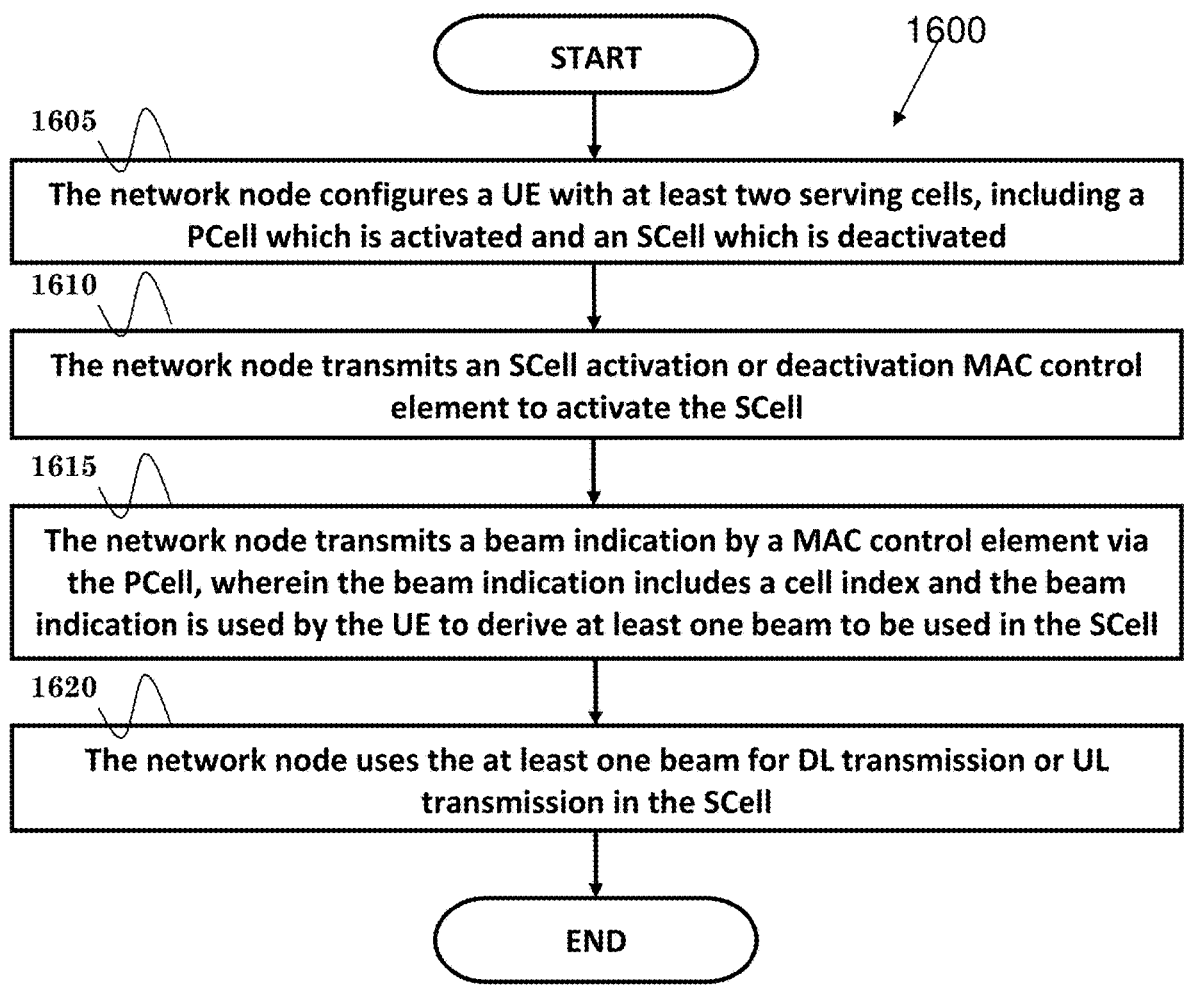
FIG. 16 is a flow chart according to one exemplary embodiment.

FIG. 16 is a flow chart 1600 according to one exemplary embodiment from the perspective of a network node. In step 1605, the network node configures a UE with at least two serving cells, including a PCell which is activated and an SCell which is deactivated. In step 1610, the network node transmits an SCell activation/deactivation MAC control element to activate the SCell. In step 1615, the network node transmits a beam indication by a MAC control element via the PCell, wherein the beam indication includes a cell index and the beam indication is used by the UE to derive at least one beam to be used in the SCell. In step 1620, the network node uses the at least one beam for DL transmission or UL transmission in the SCell.

In one embodiment, the DL transmission could include at least one of PDCCH transmission and PDSCH transmission. In other words, using the at least one beam for the DL transmission could include transmitting a PDCCH via the at least one beam. Alternatively or additionally, using the at least one beam for the DL transmission could include transmitting a PDSCH via the at least one beam.

In one embodiment, the UL transmission could include at least one of PUCCH transmission, CQI report transmission, scheduling request, reference signal transmission, and PUSCH transmission. In other words, using the at least one beam for the UL transmission could include (i) receiving PUCCH via the at least one beam, (ii) receiving CQI report via the at least one beam, (iii) receiving scheduling request via the at least one beam, (iv) receiving reference signal (such as SRS) via the at least one beam, and/or (v) receiving PUSCH via the at least one beam.

In one embodiment, the cell index could indicate that the beam indication is for which cell (such as the SCell). The at least one beam could be network beam(s) or UE beam(s).

Referring back to FIGS. 3 and 4, in one exemplary embodiment of a network node, the device 300 includes a program code 312 stored in the memory 310. The CPU 308 could execute program code 312 to enable the network node (i) to configure a UE with at least two serving cells, including a PCell which is activated and an SCell which is deactivated, (ii) to transmit an SCell activation/deactivation MAC control element to activate the SCell, (iii) to transmit a beam indication by a MAC control element via the PCell, wherein the beam indication includes a cell index and the beam indication is used by the UE to derive at least one beam to be used in the SCell, and (iv) to use the at least one beam for DL transmission or UL transmission in the SCell. Furthermore, the CPU 308 can execute the program code 312 to perform all of the above-described actions and steps or others described herein.

Figure 17:
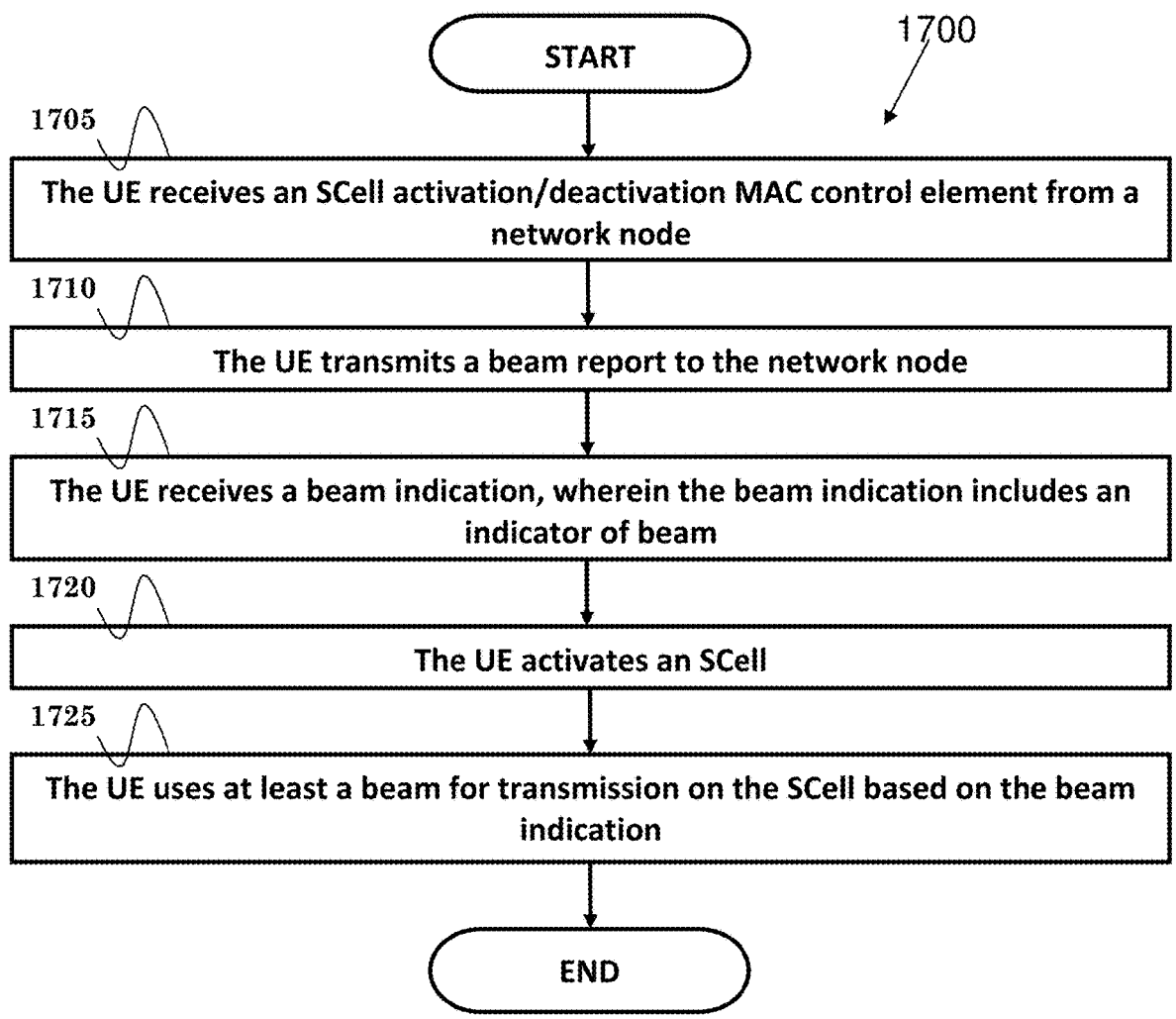
FIG. 17 is a flow chart according to one exemplary embodiment.

FIG. 17 is a flow chart 1700 according to one exemplary embodiment from the perspective of a UE. In step 1705, the UE receives an SCell activation/deactivation MAC control element from a network node. In step 1710, the UE transmits a beam report to the network node. In step 1715, the UE receives a beam indication, wherein the beam indication includes an indicator of beam. In step 1720, the UE activates an SCell. In step 1725, the UE uses at least a beam for transmission on the SCell based on the beam indication.

Referring back to FIGS. 3 and 4, in one exemplary embodiment of a UE, the device 300 includes a program code 312 stored in the memory 310. The CPU 308 could execute program code 312 to enable the UE (i) to receive an SCell activation/deactivation MAC control element from a network node, (ii) to transmit a beam report to the network node, (iii) to receive a beam indication, wherein the beam indication includes an indicator of beam, (iv) to activate an SCell, and (v) to use at least a beam for transmission on the SCell based on the beam indication. Furthermore, the CPU 308 can execute the program code 312 to perform all of the above-described actions and steps or others described herein.

Figure 18:
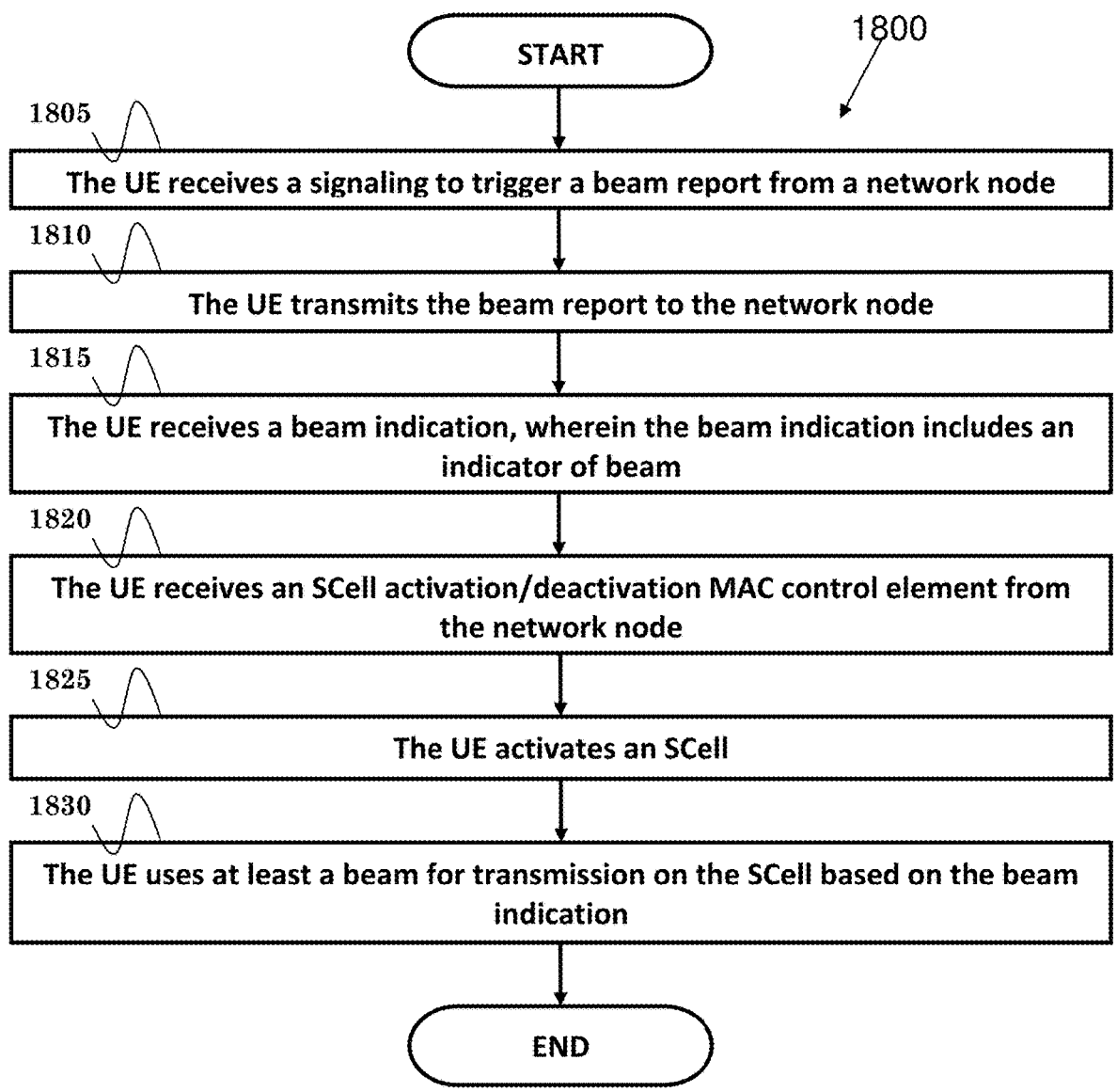
FIG. 18 is a flow chart according to one exemplary embodiment.

FIG. 18 is a flow chart 1800 according to one exemplary embodiment from the perspective of a UE. In step 1805, the UE receives a signaling to trigger a beam report from a network node. In step 1810, the UE transmits the beam report to the network node. In step 1815, the UE receives a beam indication, wherein the beam indication includes an indicator of beam. In step 1820, the UE receives an SCell activation/deactivation MAC control element from the network node. In step 1825, the UE activates an SCell. In step 1830, the UE uses at least a beam for transmission on the SCell based on the beam indication.

Referring back to FIGS. 3 and 4, in one exemplary embodiment of a UE, the device 300 includes a program code 312 stored in the memory 310. The CPU 308 could execute program code 312 to enable the UE (i) to receive a signaling to trigger a beam report from a network node, (ii) to transmit the beam report to the network node, (iii) to receive a beam indication, wherein the beam indication includes an indicator of beam, (iv) to receive an SCell activation/deactivation MAC control element from the network node, (v) to activate an SCell, and (vi) to use at least a beam for transmission on the SCell based on the beam indication. Furthermore, the CPU 308 can execute the program code 312 to perform all of the above-described actions and steps or others described herein.

Figure 19:
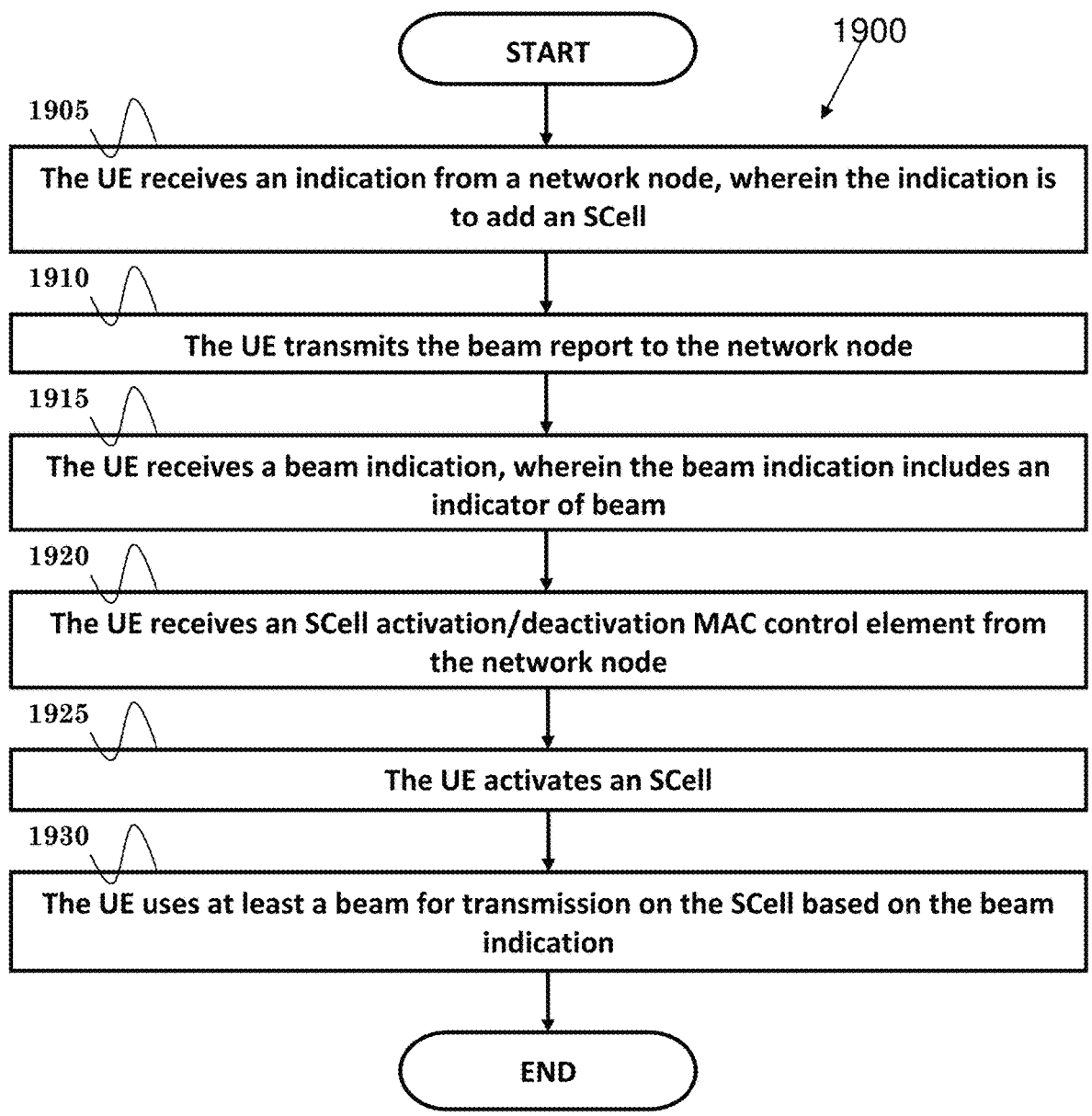
FIG. 19 is a flow chart according to one exemplary embodiment.

FIG. 19 is a flow chart 1900 according to one exemplary embodiment from the perspective of a UE. In step 1905, the UE receives an indication from a network node, wherein the indication is to add an SCell. In step 1910, the UE transmits a beam report to the network node. In step 1915, the UE receives a beam indication, wherein the beam indication includes an indicator of beam. In step 1920, the UE activates an SCell. In step 1925, the UE uses at least a beam for transmission on the SCell based on the beam indication.

Referring back to FIGS. 3 and 4, in one exemplary embodiment of a UE, the device 300 includes a program code 312 stored in the memory 310. The CPU 308 could execute program code 312 to enable the UE (i) to receive an indication from a network node, wherein the indication is to add an SCell, (ii) to transmit a beam report to the network node, (iii) to receive a beam indication, wherein the beam indication includes an indicator of beam, (iv) to activate an SCell, and (v) to use at least a beam for transmission on the SCell based on the beam indication. Furthermore, the CPU 308 can execute the program code 312 to perform all of the above-described actions and steps or others described herein.

Figure 20:
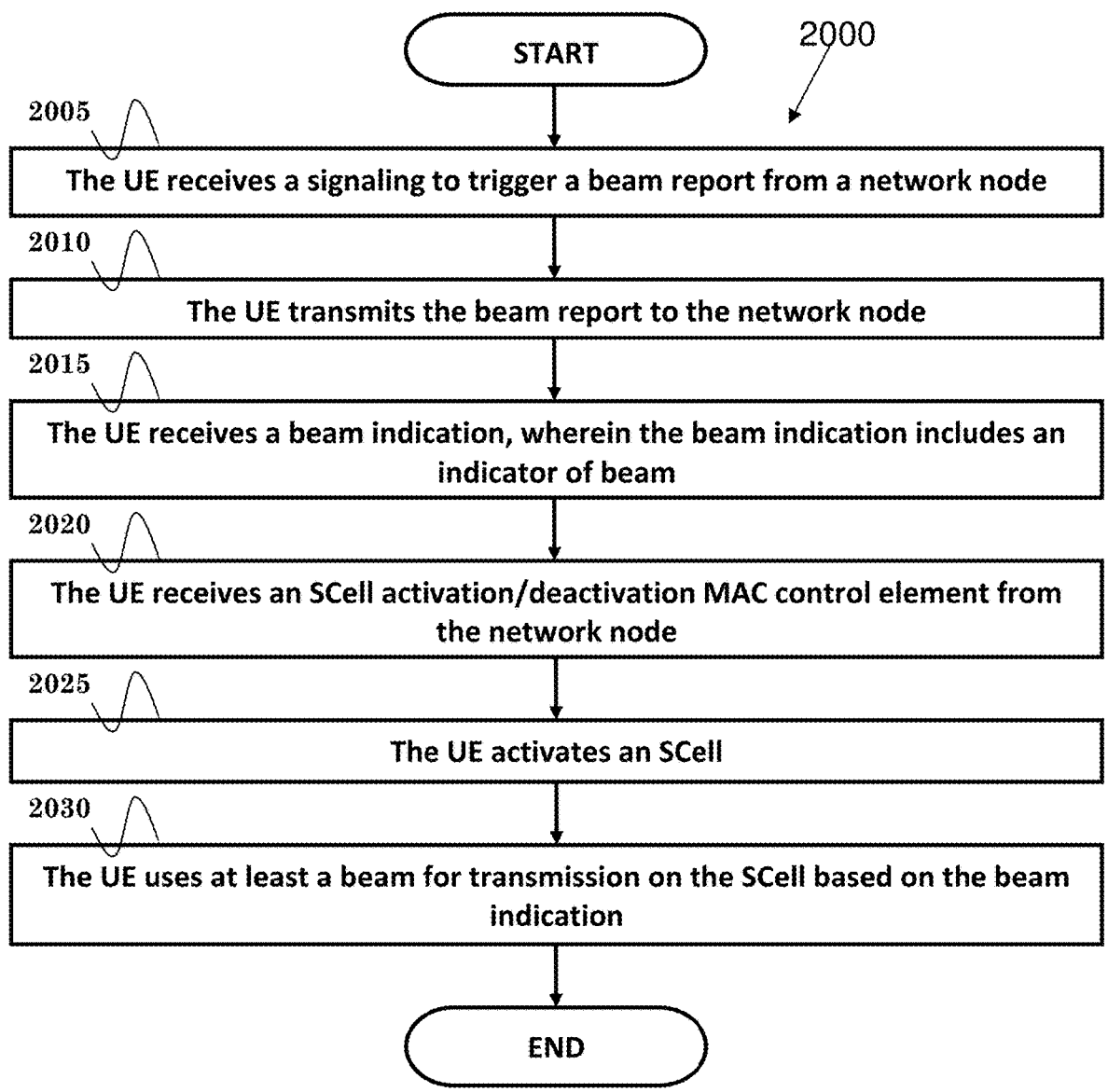
FIG. 20 is a flow chart according to one exemplary embodiment.

FIG. 20 is a flow chart 2000 according to one exemplary embodiment from the perspective of a UE. In step 2005, the UE receives a signaling to trigger a beam report from a network node. In step 2010, the UE transmits the beam report to the network node. In step 2015, the UE receives a beam indication, wherein the beam indication includes an indicator of beam. In step 2020, the UE receives an indication from the network node, wherein the indication is to add an SCell. In step 2025, the UE activates an SCell. In step 2030, the UE uses at least a beam for transmission on the SCell based on the beam indication.

Referring back to FIGS. 3 and 4, in one exemplary embodiment of a UE, the device 300 includes a program code 312 stored in the memory 310. The CPU 308 could execute program code 312 to enable the UE (i) to receive a signaling to trigger a beam report from a network node, (ii) to transmit the beam report to the network node, (iii) to receive a beam indication, wherein the beam indication includes an indicator of beam, (iv) to receive an indication from the network node, wherein the indication is to add an SCell, (v) to activate an SCell, and (vi) to use at least a beam for transmission on the SCell based on the beam indication.

Furthermore, the CPU 308 can execute the program code 312 to perform all of the above-described actions and steps or others described herein.

In the context of the embodiments described above, the SCell activation/deactivation MAC control element could be used to activate or deactivate at least an SCell.

In one embodiment, the SCell could be an SCell which is deactivated before activating. Alternatively, the SCell could be initially activated. Alternatively, the SCell could be an SCell which is not serving the UE before receiving the indication.

In one embodiment, the signaling may be received together with the SCell activation/deactivation MAC control element. The signaling may be received when receiving the SCell activation/deactivation MAC control element, before receiving the SCell activation/deactivation MAC control element, or after receiving the SCell activation/deactivation MAC control element. Furthermore, the signaling may be received from a cell which is transmitting the SCell activation/deactivation MAC control element.

In one embodiment, the beam indication may be received (or transmitted) together with the SCell activation/deactivation MAC control element. The beam indication may be received when receiving (or transmitting) the SCell activation/deactivation MAC control element, before receiving (or transmitting) the SCell activation/deactivation MAC control element, or after receiving (or transmitting) the S Cell activation/deactivation MAC control element.

In one embodiment, the indication may be a RRC signaling (e.g. RRC connection reconfiguration). The indication may include an indicator of SCell (e.g. sCellIndex).

In one embodiment, the signaling may be received together with the indication. The signaling may be received when receiving the indication, before receiving the indication, or after receiving the indication. The signaling may be received from a cell which is transmitting the indication. Similarly, the beam indication may be received together with the indication. The beam indication may be received when receiving the indication, before receiving the indication, or after receiving the indication.

In one embodiment, the signal could trigger beam reporting. When the UE receives the signal, the UE may perform beam measurement. The signaling may be received from the SCell or a PCell. The signaling may be received from a cell which is not the SCell. The signaling may include an indicator of cell(s), e.g. cell index.

In one embodiment, the beam report could be for measuring at least a reference signal associated with a beam and to report a result of measurement. The beam report may include an indicator of at least a beam, an indicator of a cell (e.g. cell index), an information of reference signal receiving power, and/or beam information of any cell which is measured by the UE.

In one embodiment, the beam indication may include an indicator of at least a beam and/or an indicator of a cell (e.g. cell index).

In one embodiment, the at least one beam could be composed of at least a network beam and/or a UE beam. The at least one beam may be associated with a DL broadcast signal (e.g. SS block), a DL reference signal (e.g. CSI-RS), or a UL reference signal (e.g. SRS).

In one embodiment, the transmission may be a DL transmission or an UL transmission.

In one embodiment, if the SCell is activated, the UE may perform a DL data transmission, may perform a UL data transmission, may monitor PDCCH on the SCell, and/or may perform measurement of a reference signal. If the SCell is activated, the UE may report CQI, PMI, RI, PTI, and/or CRI on the SCell. In addition, the UE may perform PUCCH transmission on the SCell.

In one embodiment, the reference signal could be a SS block, a CSI-RS, or any reference signal related to beam.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for a UE (User Equipment) configured with at least two serving cells, including a PCell (Primary Cell) which is activated and an SCell (Secondary Cell) which is deactivated, comprising:

receiving, by the UE from a network node, an SCell activation/deactivation MAC (Medium Access Control) control element to activate the SCell;

activating, by the UE, the SCell based on the SCell activation/deactivation MAC control element;

receiving, by the UE from the network node, a beam indication by a MAC control element via the PCell, wherein the beam indication includes an indicator of SSB (SS Block) or CSI-RS (Channel State Information Reference Signal) and a cell index indicating that the beam indication is for the SCell, and the beam indication is used to derive at least one beam to be used in the SCell for monitoring PDCCH (Physical Downlink Control Channel) or for an UL (Uplink) transmission on PUCCH (Physical Uplink Control Channel) or PUSCH (Physical Uplink Shared Channel), wherein whether the at least one beam is used for monitoring the PDCCH or for the UL transmission is determined by the network node; and using, by the UE, the at least one beam for monitoring the PDCCH or for the UL transmission in the SCell.

2. The method of claim 1, wherein the UL transmission includes at least one of CQI (Channel Quality Indicator) report transmission.

3. The method of claim 1, wherein the at least one beam is at least one network beam or at least one UE beam.

4. A method for a network node, comprising:
configuring, by the network node, a UE (User Equipment) with at least two serving cells, including a PCell (Primary Cell) which is activated and an SCell (Secondary Cell) which is deactivated;
transmitting, by the network node, an SCell activation/deactivation MAC (Medium Access Control) control element to activate the SCell;
transmitting, by the network node, a beam indication by a MAC control element via the PCell, wherein the beam indication includes an indicator of SSB (SS Block) or CSI-RS (Channel State Information Reference Signal) and a cell index indicating that the beam indication is for the SCell, and the beam indication is used by the UE to derive at least one beam to be used in the SCell for PDCCH (Physical Downlink Control Channel) or for an UL (Uplink) transmission on PUCCH (Physical Uplink Control Channel) or PUSCH (Physical Uplink Shared Channel), wherein the network node determines whether the at least one beam is used for the PDCCH or for the UL transmission; and
using, by the network node, the at least one beam for the PDCCH or for the UL transmission in the SCell.

5. The method of claim 4, wherein the UL transmission includes at least one of CQI (Channel Quality Indicator) report transmission.

6. The method of claim 4, wherein the at least one beam is at least one network beam or at least one UE beam.

7. A User Equipment (UE) configured with at least two serving cells, including a PCell (Primary Cell) which is activated and an SCell (Secondary Cell) which is deactivated, comprising:
a processor; and
a memory operatively coupled to the processor, wherein the processor is configured to execute a program code to:
receive, by the UE from a network node, an SCell activation/deactivation MAC (Medium Access Control) control element to activate the SCell;
activate, by the UE, the SCell based on the SCell activation/deactivation MAC control element;
receive, by the UE from the network node, a beam indication by a MAC control element via the PCell, wherein the beam indication includes an indicator of SSB (SS Block) or CSI-RS (Channel State Information Reference Signal) and a cell index indicating that the beam indication is for the SCell, and the beam indication is used to derive at least one beam to be used in the SCell for monitoring PDCCH (Physical Downlink Control Channel) or for an UL (Uplink) transmission on PUCCH (Physical Uplink Control Channel) or PUSCH (Physical Uplink Shared Channel), wherein whether the at least one beam is used for monitoring the PDCCH or for the UL transmission is determined by the network node; and
use, by the UE, the at least one beam for monitoring the PDCCH or for the UL transmission in the SCell.

8. The UE of claim 7, wherein the UL transmission includes at least one of CQI (Channel Quality Indicator) report transmission.

9. The UE of claim 7, wherein the at least one beam is at least one network beam or at least one UE beam.

10. A network node, comprising:
a processor; and
a memory operatively coupled to the processor, wherein the processor is configured to execute a program code to:
configure, by the network node, a UE (User Equipment) with at least two serving cells, including a PCell (Primary Cell) which is activated and an SCell (Secondary Cell) which is deactivated;
transmit, by the network node, an SCell activation/deactivation MAC (Medium Access Control) control element to activate the SCell;
transmit, by the network node, a beam indication by a MAC control element via the PCell, wherein the beam indication includes an indicator of SSB (SS Block) or CSI-RS (Channel State Information Reference Signal) and a cell index indicating that the beam indication is for the SCell, and the beam indication is used by the UE to derive at least one beam to be used in the SCell for PDCCH (Physical Downlink Control Channel) or for an UL (Uplink) transmission on PUCCH (Physical Uplink Control Channel) or PUSCH (Physical Uplink Shared Channel), wherein the network node determines whether the at least one beam is used for the PDCCH or for the UL transmission; and
use, by the network node, the at least one beam for the PDCCH or for the transmission in the SCell.

11. The network node of claim 10, wherein the UL transmission includes at least one of CQI (Channel Quality Indicator) report transmission.

12. The network node of claim 10, wherein the at least one beam is at least one network beam or at least one UE beam.

13. The method of claim 1, wherein the UL transmission includes at least one scheduling request.

14. The method of claim 4, wherein the UL transmission includes at least one scheduling request.

15. The UE of claim 7, wherein the UL transmission includes at least one scheduling request.

16. The network node of claim 10, wherein the UL transmission includes at least one scheduling request.

* * * * *